US012810613B2

(12) United States Patent
Takagi

(10) Patent No.: US 12,810,613 B2
(45) Date of Patent: Nov. 24, 2026

(54) INFORMATION PROCESSING METHOD AND INFORMATION PROCESSING DEVICE

(71) Applicant: BRIDGESTONE SPORTS CO., LTD., Tokyo (JP)

(72) Inventor: Hiroo Takagi, Saitama (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 289 days.

(21) Appl. No.: 18/426,849

(22) Filed: Jan. 30, 2024

(65) Prior Publication Data

US 2024/0257518 A1 Aug. 1, 2024

(30) Foreign Application Priority Data

Jan. 31, 2023 (JP) ................................ 2023-012650

(51) Int. Cl.
*G06K 9/00* (2022.01)
*G06V 20/40* (2022.01)
*G06V 40/20* (2022.01)

(52) U.S. Cl.
CPC .............. *G06V 20/44* (2022.01); *G06V 20/42* (2022.01); *G06V 20/46* (2022.01); *G06V 20/48* (2022.01); *G06V 40/23* (2022.01)

(58) Field of Classification Search
CPC ............................... G06V 20/44; G06V 40/23
See application file for complete search history.

(56) References Cited

U.S. PATENT DOCUMENTS

2014/0163424 A1 6/2014 Kawaguchi et al.
2015/0092995 A1 4/2015 Ishihara
2015/0201150 A1* 7/2015 Kimura .................. G09G 5/391 348/564
2017/0189784 A1 7/2017 Sasaki
2023/0334693 A1 10/2023 Miyajima et al.
2024/0355223 A1* 10/2024 Oku ......................... G10C 1/00
(Continued)

FOREIGN PATENT DOCUMENTS

JP 2012-181736 9/2012
JP 2016081121 A * 5/2016
JP 5935779 6/2016
(Continued)

OTHER PUBLICATIONS

Office Action mailed Sep. 1, 2026 with respect to the corresponding Japanese patent application No. 2023-012650.

*Primary Examiner* — Emily C Terrell
*Assistant Examiner* — Aidan Keup
(74) *Attorney, Agent, or Firm* — IPUSA, PLLC

(57) ABSTRACT

An information processing method includes extracting key points related to golf swing motion of a human subject from each of images in a video. The information processing method includes acquiring data representing motion of both the human subject and a golf club in each of the images, based on the key points, the data including data related to at least one of positions, or velocities, of both a body part of the human subject and the golf club. The information processing method includes estimating a timing of a predetermined event in the video based on a similarity between the data acquired for each of the images and reference data representing motion of a person and the golf club, upon occurrence of a condition in which the predetermined event in the golf swing motion occurs.

17 Claims, 14 Drawing Sheets

(56) References Cited

U.S. PATENT DOCUMENTS

2024/0382806 A1* 11/2024 Omid-Zohoor ...... A61B 5/6895
2024/0394897 A1* 11/2024 Ishimura .................. G06T 7/00

FOREIGN PATENT DOCUMENTS

| | | |
|---|---|---|
| JP | 2017-012586 | 1/2017 |
| JP | 2017-064095 | 4/2017 |
| JP | 6683874 | 4/2020 |
| JP | 6908312 | 7/2021 |
| JP | 2022-030683 | 2/2022 |
| WO | 2016/056449 | 4/2016 |

* cited by examiner

INFORMATION PROCESSING METHOD AND INFORMATION PROCESSING DEVICE

CROSS-REFERENCE TO RELATED APPLICATION

This application claims priority under 35 U.S.C. § 119 to Japanese Patent Application No. 2023-012650, filed on Jan. 31, 2023, the contents of which are incorporated herein by reference in their entirety.

BACKGROUND

1. Technical Field

The present disclosure relates to an information processing method and the like.

2. Description of the Related Art

Techniques for estimating a timing of a predetermined event (for example, address, top-of-swing, impact, or the like) in predetermined motion (for example, golf swing motion) of a subject in a video has been disclosed (see Patent Documents 1 to 3).

Patent Document 1 discloses a method of estimating a timing of a predetermined event by extracting images each in which data such as positions and velocities of key points of a human subject of a video or a tool carried by the person (for example, a golf club) satisfy a specific condition.

Patent Documents 2 and 3 disclose methods of estimating an image corresponding to a timing of a predetermined event by focusing on changes in pixel values over a specific region in each of frame images that constitute a video.

RELATED-ART DOCUMENTS

Patent Documents

Patent Document 1: Japanese Patent No. 6908312
Patent Document 2: Japanese Patent No. 5935779
Patent Document 3: Japanese Patent No. 6683874

SUMMARY

In one aspect of the present disclosure, an information processing method is provided. The method includes:

- extracting, by an information processing device, multiple key points related to golf swing motion of a human subject from each of multiple images included in a video, the key points including a key point representing a body part of the human subject and a key point representing a golf club;
- acquiring, by the information processing device, data representing motion of both the human subject and the golf club in each of the images based on the key points extracted in the extracting step, the data including data related to either positions, velocities, or both of the body part of the human subject and the golf club; and
- estimating, by the information processing device, a timing of a predetermined event in the video based on a similarity between the data acquired for each of the images in the acquiring step and reference data representing motion of a person and a golf club at a time of occurrence of the predetermined event in golf swing motion.

DETAILED DESCRIPTION

A form of predetermined motion may vary depending on a person who performs the predetermined motion. Therefore, in a certain frame image in a video, even though a predetermined event has occurred, a case where a specific condition corresponding to the predetermined event is not satisfied or a case where a predetermined change does not occur in a specific image region may occur. As a result, there is a possibility that the occurrence of the predetermined event cannot be appropriately estimated.

In view of the above problem, it is an object of the present disclosure to provide a technique capable of more appropriately estimating a timing of occurrence of a predetermined event related to predetermined motion from a video in which a person performing the predetermined motion is recorded.

Hereinafter, embodiments will be described with reference to the drawings.

[Overview of Swing Diagnosis System]

An overview of a swing diagnosis system 1 according to the present embodiments will be described with reference to FIG. 1.

Figure 1:
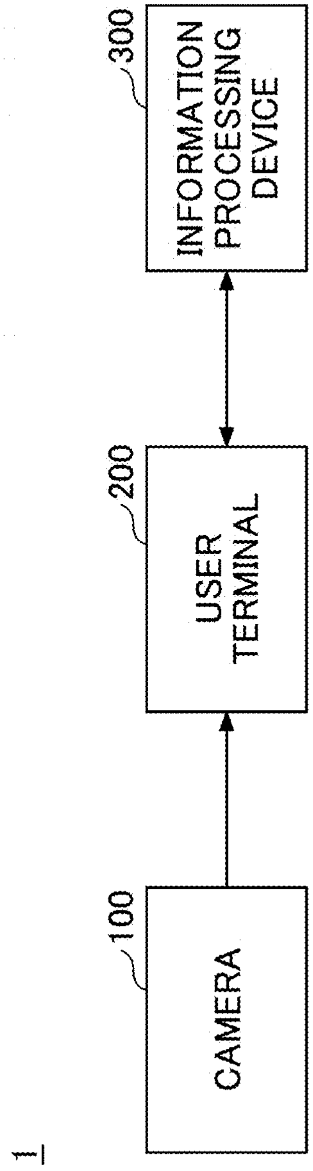
FIG. 1 is a diagram illustrating an example of a swing diagnosis system.

FIG. 1 is a diagram illustrating an example of the swing diagnosis system 1.

As illustrated in FIG. 1, the swing diagnosis system 1 includes a camera 100, a user terminal 200, and an information processing device 300.

In the swing diagnosis system 1, the information processing device 300 performs diagnosis (hereinafter, referred to as "swing diagnosis") regarding golf swing motion of a user on the basis of video data in which the golf swing motion of the user is recorded, which is acquired by the camera 100. The swing diagnosis system 1 provides a diagnosis result of the swing diagnosis to the user through the user terminal 200.

The camera 100 captures images of the golf swing motion performed by the user, and acquires a video of the swing motion.

Although the camera 100 and the user terminal 200 are illustrated separately in FIG. 1, the camera 100 may be installed in the user terminal 200 or may be provided separately from the user terminal 200. In the latter case, an output (video) of the camera 100 may be taken into the user terminal 200 via a communication network or may be taken into the user terminal 200 through a recording medium 201A described below.

The user terminal 200 is a terminal device used by a user who receives a swing diagnosis. The user terminal 200 may be, for example, a terminal device available in a golf lesson facility, a shop, or the like, or may be a terminal device owned by a user.

The user terminal 200 is, for example, a portable terminal device, that is, a mobile terminal. The mobile terminal is, for example, a smartphone, a tablet terminal, a laptop personal computer (PC), or the like. The user terminal 200 may also be a stationary type terminal device. The stationary type terminal device is, for example, a desktop PC.

The user terminal 200 is communicably connected to the information processing device 300 via a predetermined communication line. The predetermined communication line includes, for example, a local area network (LAN). The predetermined communication line may also include a wide area network (WAN). The wide area network includes, for example, the Internet network. The wide area network may include a mobile communication network whose terminals are base stations and a satellite communication network using communication satellites. Furthermore, the predetermined communication line may be a short distance communication line based on wireless communication standards such as WiFi, Bluetooth (registered trademark), or a local 5th Generation (5G).

The user terminal 200 takes in a video illustrating the golf swing motion of the user from the camera 100 to transmit the video to the information processing device 300. The user terminal 200 presents the swing diagnosis result received from the information processing device 300 to the user through a display device 208 described below.

The information processing device 300 performs swing diagnosis based on the video illustrating the golf swing motion of the user, which is received from the user terminal 200, and transmits the swing diagnosis result to the user terminal 200.

The information processing device 300 is, for example, a server device having a relatively high processing capability. The server device may be a cloud server or an on-premise server, or may be an edge server. Depending on the information processing device's processing capability necessary for the swing diagnosis, the information processing device may be a terminal device having a lower processing capability than a server device. The terminal device may be a stationary type terminal device or a portable terminal device (mobile terminal).

[Hardware Configuration of Swing Diagnosis System]

A hardware configuration of the swing diagnosis system 1 (the user terminal 200 and the information processing device 300) will be described with reference to FIG. 2 and FIG. 3 in addition to FIG. 1.

<Hardware Configuration of User Terminal>

Figure 2:
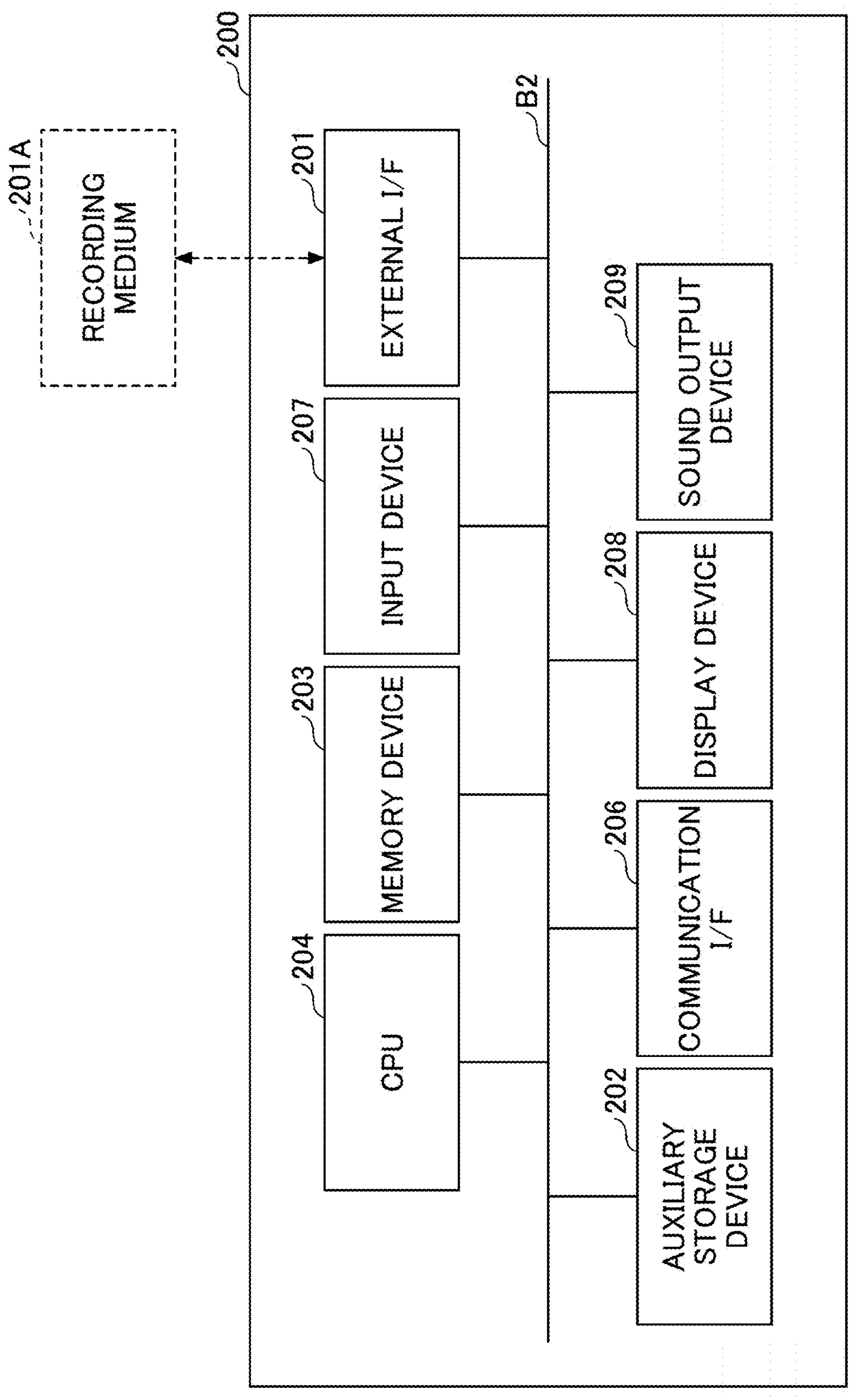
FIG. 2 is a diagram illustrating an example of a hardware configuration of a user terminal.

FIG. 2 is a block diagram illustrating an example of a hardware configuration of the user terminal 200.

The functions of the user terminal 200 are implemented by any hardware, a combination of any hardware and software, or the like. For example, as illustrated in FIG. 2, the user terminal 200 includes an external interface 201, an auxiliary storage device 202, a memory device 203, a CPU 204, a communication interface 206, an input device 207, the display device 208, and a sound output device 209, which are connected by a bus B2. Furthermore, in a case where the camera 100 is installed in the user terminal 200, the camera 100 may be connected to the bus B2 in the same manner as the other components as described above.

The external interface 201 functions as an interface for reading data from the recording medium 201A and writing data to the recording medium 201A. The recording medium 201A includes, for example, flexible disks, compact discs (CDs), digital versatile discs (DVDs), blue-ray (trademark) discs (BDs), SD memory cards, and universal serial bus (USB) memories. The user terminal 200 can read various kinds of data used in processing and store the data in the auxiliary storage device 202, and install programs for implementing various functions, through the recording medium 201A.

Note that the user terminal 200 may acquire various data and programs used in processing from an external device through the communication interface 206.

The auxiliary storage device 202 stores the installed various programs, files, data, and the like necessary for various processes. The auxiliary storage device 202 includes, for example, a hard disk drive (HDD), a solid state drive (SSD), a flash memory, or the like.

When an instruction to launch a program is issued, the memory device 203 loads the program from the auxiliary storage device 202. The memory device 203 includes, for example, a dynamic random access memory (DRAM) or a static random access memory (SRAM).

The CPU 204 executes various programs loaded from the auxiliary storage device 202 to the memory device 203, and implements various functions related to the user terminal 200 in accordance with the respective programs.

The communication interface 206 is used as an interface for communicably connecting to an external device. Accordingly, the user terminal 200 can acquire video data from the camera 100 through the communication interface 206. The user terminal 200 can also communicate with an external device such as the information processing device 300 through the communication interface 206. The communication interface 206 may include multiple types of communication interface depending on a communication system between the communication interface and a device to be connected.

The input device 207 receives various inputs from the user.

The input device 207 includes, for example, an input device (hereinafter, referred to as an "operation input device") that receives mechanical operation input from the user. The operation input device includes, for example, a button, a toggle, a lever, a touch panel implemented in the display device 208, a touch pad provided separately from the display device 208, a keyboard, a mouse, and the like.

The input device 207 may include a voice input device capable of receiving voice input from the user. The voice input device includes, for example, a microphone capable of collecting the voice of the user.

The input device 207 may also include a gesture input device capable of receiving gesture input from the user. The gesture input device includes, for example, a camera capable of capturing an image of a gesture of the user.

Furthermore, the input device 207 may include a biometric input device capable of receiving biometric input from the user. The biometric input device includes, for example, a camera capable of acquiring image data containing information on a fingerprint or an iris of the user.

The display device 208 displays an information screen and an operation screen to the user. The display device 208 is, for example, a liquid crystal display, an organic electroluminescence (EL) display, or the like.

The sound output device 209 transmits various kinds of information to the user of the user terminal 200 by sound. The sound output device 209 is, for example, a buzzer, an alarm, a speaker, or the like.

<Hardware Configuration of Information Processing Device>

Figure 3:
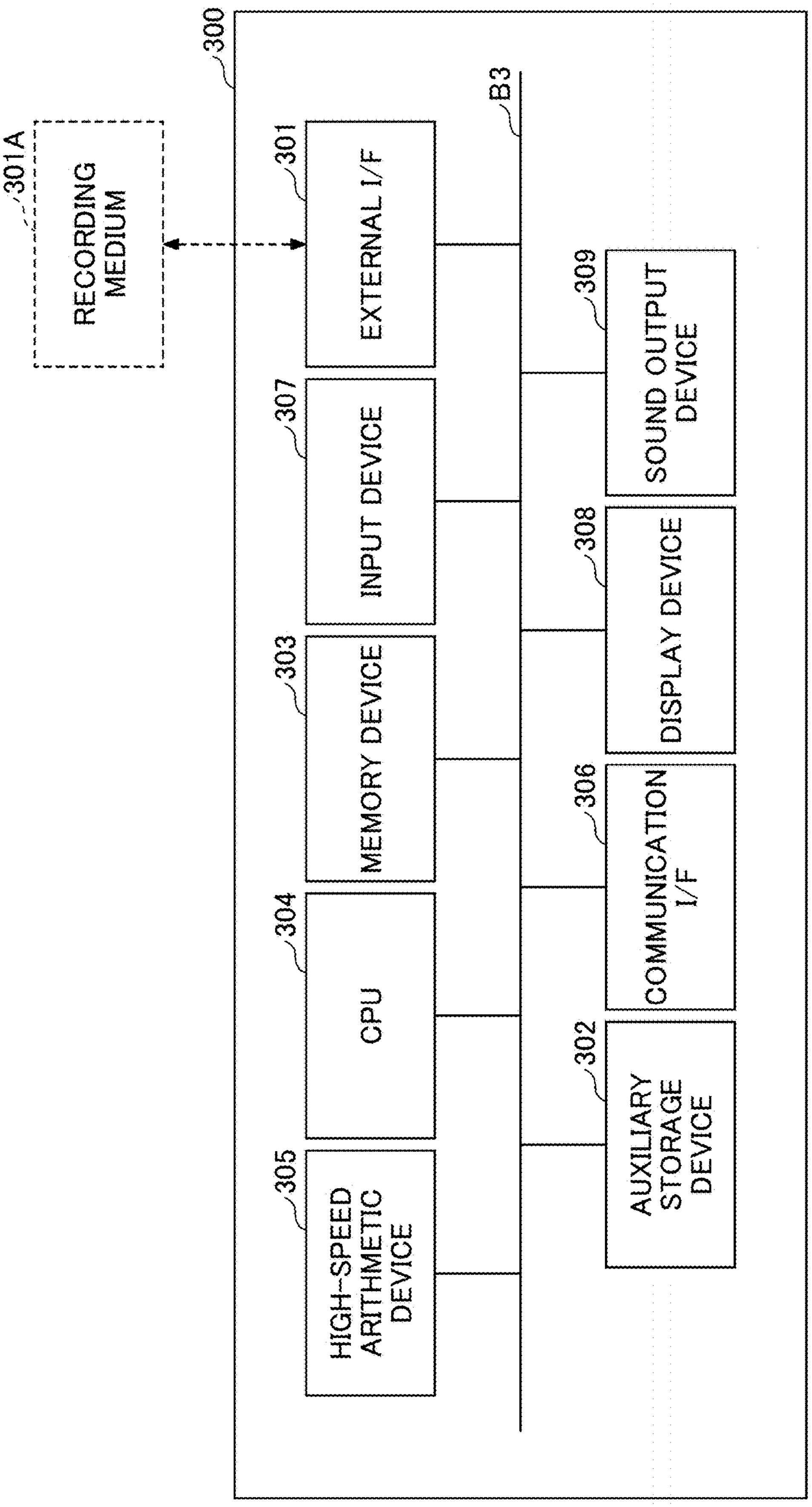
FIG. 3 is a diagram illustrating an example of a hardware configuration of an information processing device.

FIG. 3 is a block diagram illustrating an example of a hardware configuration of the information processing device 300.

The functions of the information processing device 300 are implemented by any hardware, a combination of any hardware and software, or the like. For example, as illustrated in FIG. 3, the information processing device 300 includes an external interface 301, an auxiliary storage device 302, a memory device 303, a CPU 304, a high-speed arithmetic device 305, a communication interface 306, an input device 307, a display device 308, and a sound output device 309, which are connected by a bus B3.

The external interface 301 functions as an interface for reading data from a recording medium 301A and writing data to the recording medium 301A. The recording medium 301A includes, for example, flexible disks, CDs, DVDs, BDs, SD memory cards, USB memories, and the like. The information processing device 300 can read various kinds of information used in processing, store the information in the auxiliary storage device 302, and install programs for implementing various functions, through the recording medium 301A.

Note that the information processing device 300 may acquire various data and programs used in processing from an external device via the communication interface 306.

The auxiliary storage device 302 stores the installed various programs, files, data, and the like necessary for various processes. The auxiliary storage device 302 includes, for example, an HDD, an SSD, a flash memory, or the like.

When an instruction to launch a program is issued, the memory device 303 loads the program from the auxiliary storage device 302. The memory device 303 includes, for example, a DRAM or an SRAM.

The CPU 304 executes various programs loaded from the auxiliary storage device 302 to the memory device 303, and implements various functions related to the information processing device 300 according to the respective programs.

The high-speed arithmetic device 305 operates in conjunction with the CPU 304 and performs arithmetic processing at a relatively high speed to the CPU 304. The high-speed arithmetic device 305 includes, for example, a graphics processing unit (GPU), an application specific integrated circuit (ASIC), a field-programmable gate array (FPGA), or the like.

The high-speed arithmetic device 305 may be omitted depending on a required processing speed.

The communication interface 306 is used as an interface for communicably connecting to an external device. Accordingly, the information processing device 300 can communicate with an external device such as the user terminal 200 through the communication interface 306. The communication interface 306 may include multiple types of communication interface depending on a communication system between the communication interface and a device to be connected.

The input device 307 receives various inputs from the user.

The input device 307 includes, for example, an operation input device that receives mechanical operation input from the user. The operation input device includes, for example, a button, a toggle, a lever, a touch panel implemented on the display device 308, a touch pad provided separately from the display device 308, a keyboard, a mouse, and the like.

The input device 307 includes, for example, a voice input device capable of receiving voice input from the user. The voice input device includes, for example, a microphone capable of collecting the voice of the user.

The input device 307 includes, for example, a gesture input device capable of receiving gesture input from the user. The gesture input device includes, for example, a camera capable of capturing an image of a gesture of the user.

The input device 307 includes, for example, a biometric input device capable of receiving biometric input from the user. The biometric input device includes, for example, a camera capable of acquiring image data containing information on a fingerprint or an iris of the user.

The display device 308 displays an information screen and an operation screen to the user. The display device 308 is, for example, a liquid crystal display, an organic EL display, or the like.

The sound output device 309 transmits various kinds of information to the user of the information processing device 300 by sound. The sound output device 309 is, for example, a buzzer, an alarm, a speaker, or the like.

[First Example of Functional Configuration of Swing Diagnosis System]

A first example of a functional configuration of the swing diagnosis system 1 will be described with reference to FIG. 4 to FIG. 9.

Figure 4:
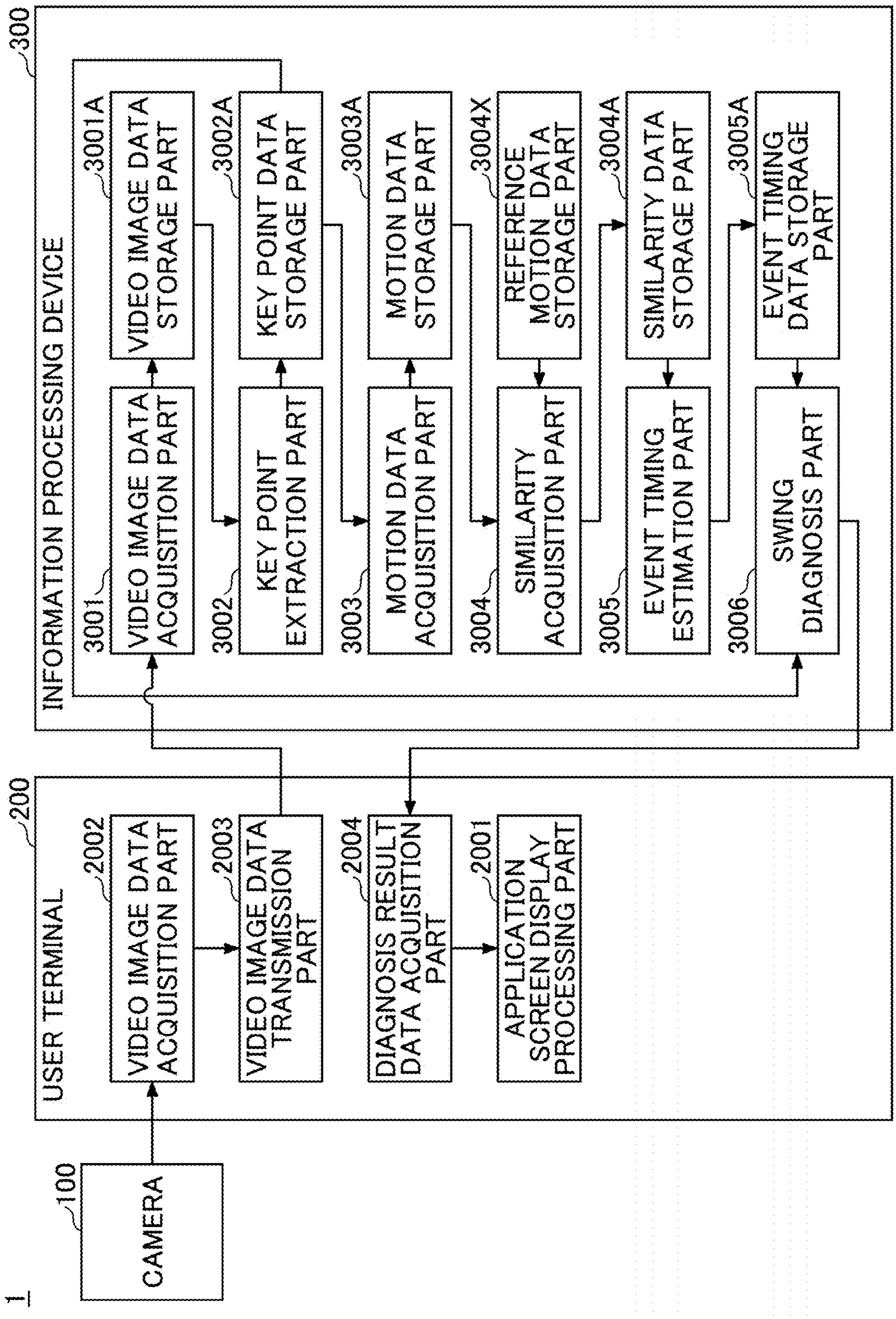
FIG. 4 is a block diagram illustrating a first example of a functional configuration of the swing diagnosis system.
Figure 5:
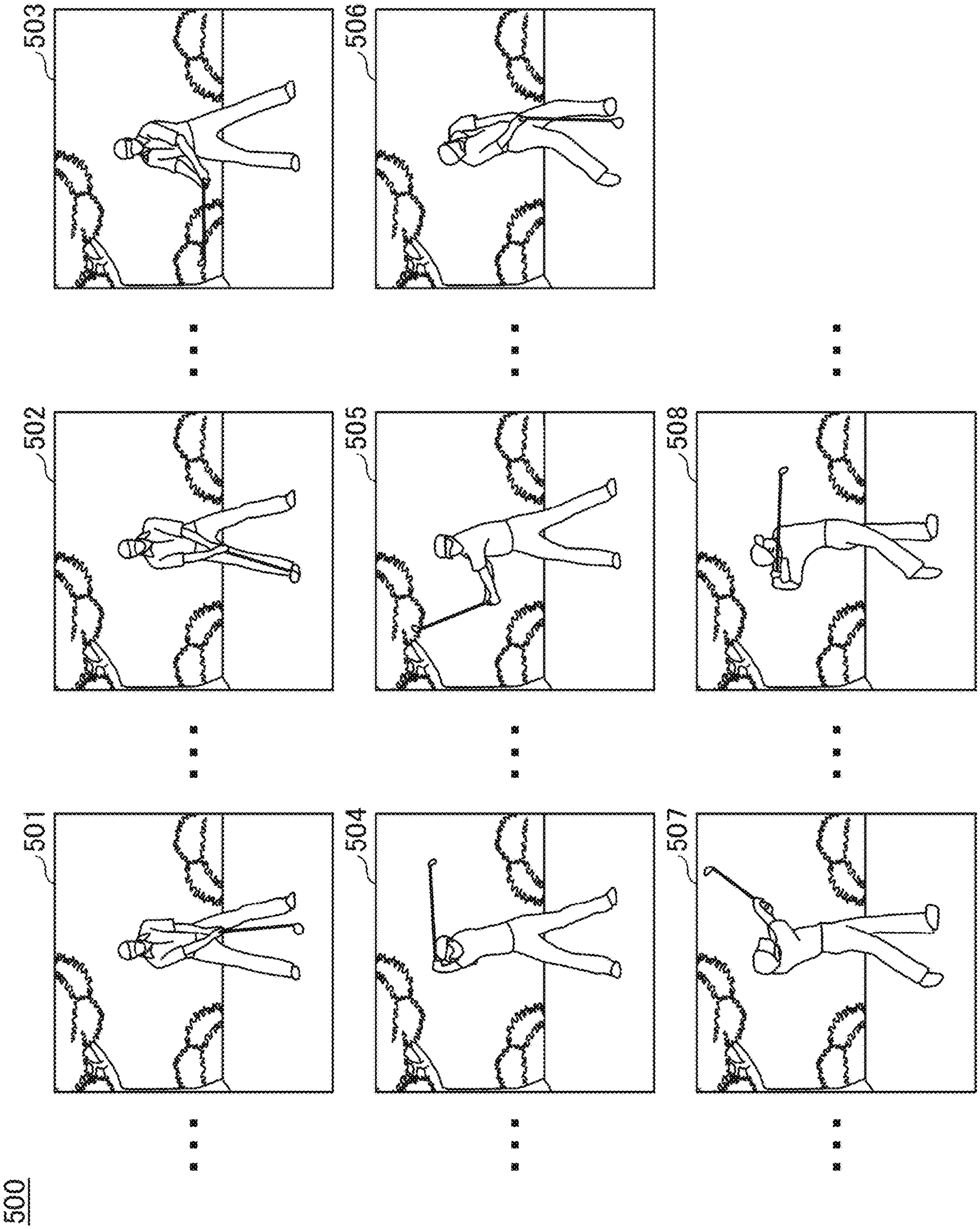
FIG. 5 is a diagram illustrating examples of a video illustrating positions of golf swing motion by a user.
Figure 6:
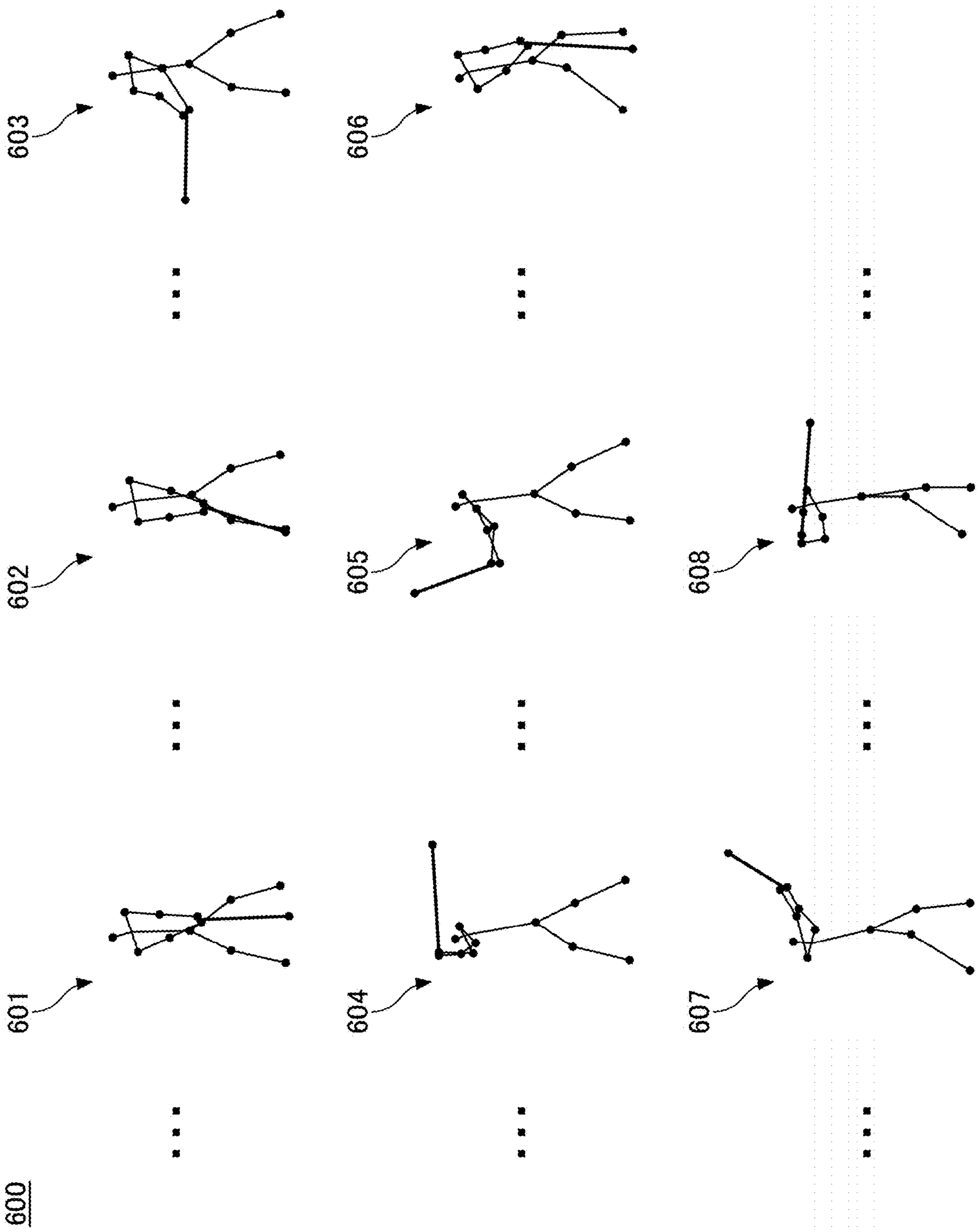
FIG. 6 is a diagram for explaining key points for each of frame images included in the video illustrating the positions of golf swing motion of the user.
Figure 7:
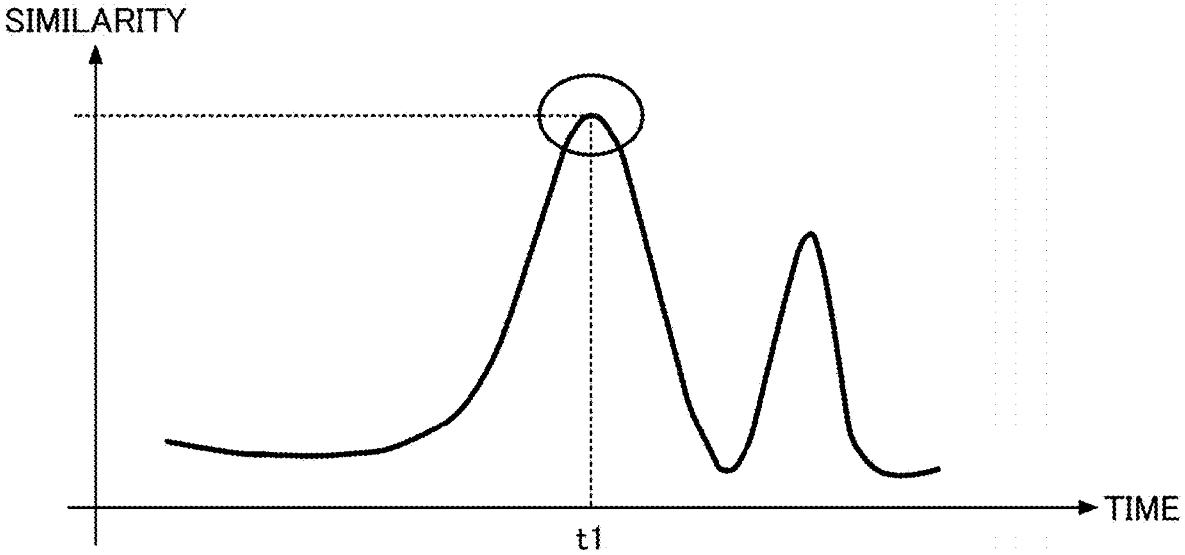
FIG. 7 is a diagram illustrating a first example of a method of estimating a timing of a predetermined event in the golf swing motion in the video.
Figure 8:
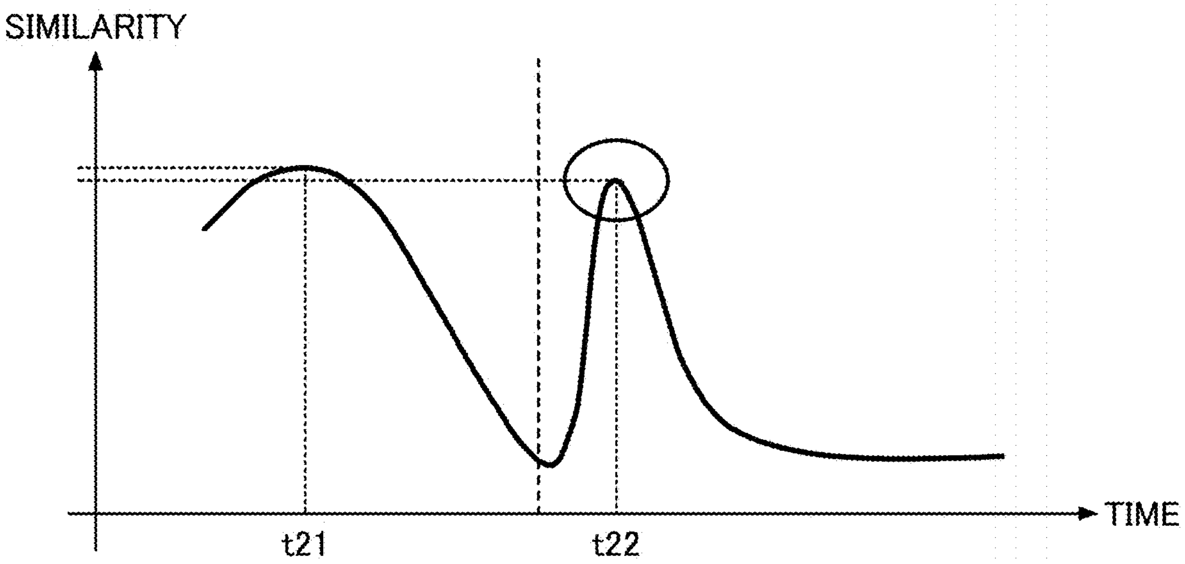
FIG. 8 is a diagram illustrating a second example of the method of estimating the timing of a predetermined event in the golf swing motion in the video.
Figure 9:
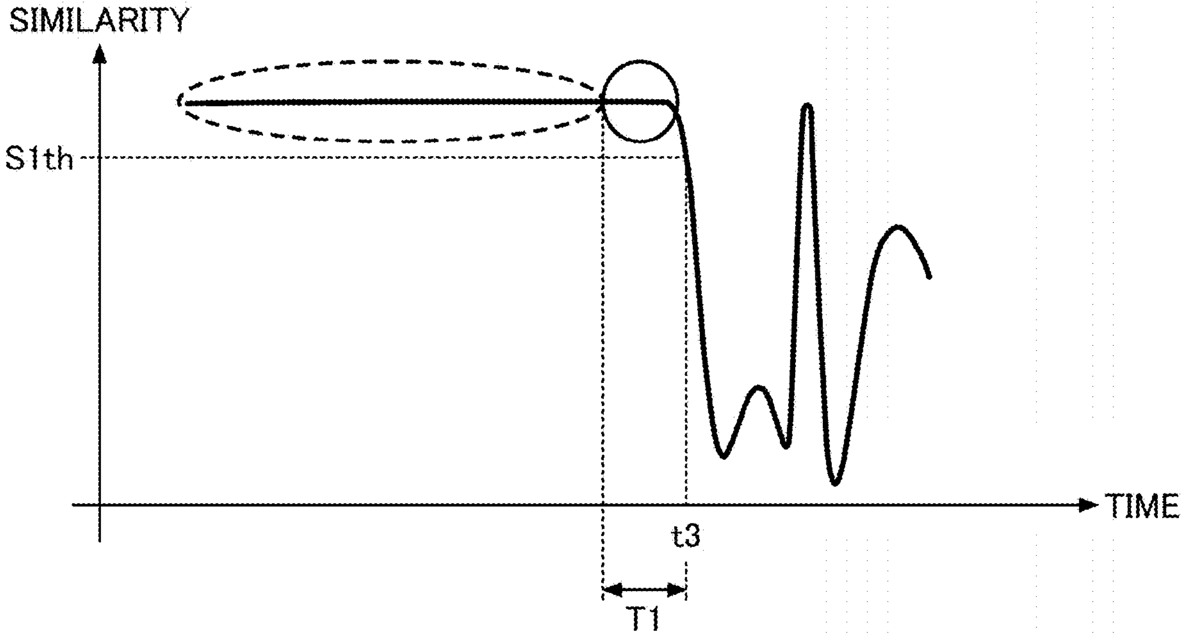
FIG. 9 is a diagram illustrating a third example of the method of estimating the timing of a predetermined event in the golf swing motion in the video.
Figure 10:
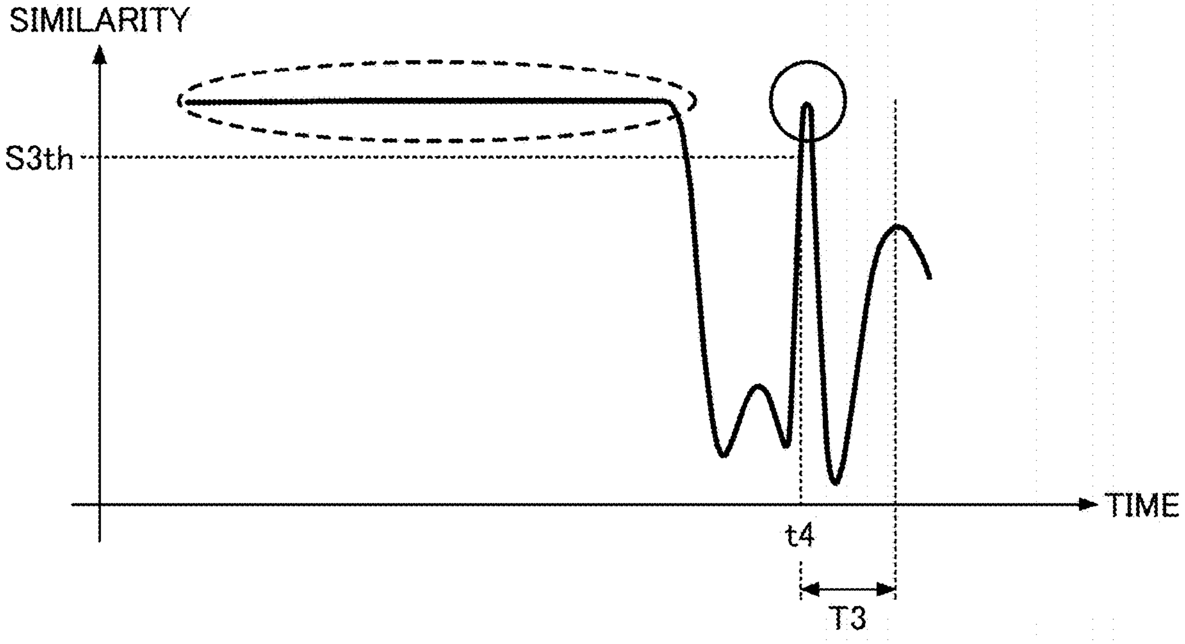
FIG. 10 is a diagram illustrating a fourth example of the method of estimating the timing of a predetermined event in the golf swing motion in the video.
Figure 11:
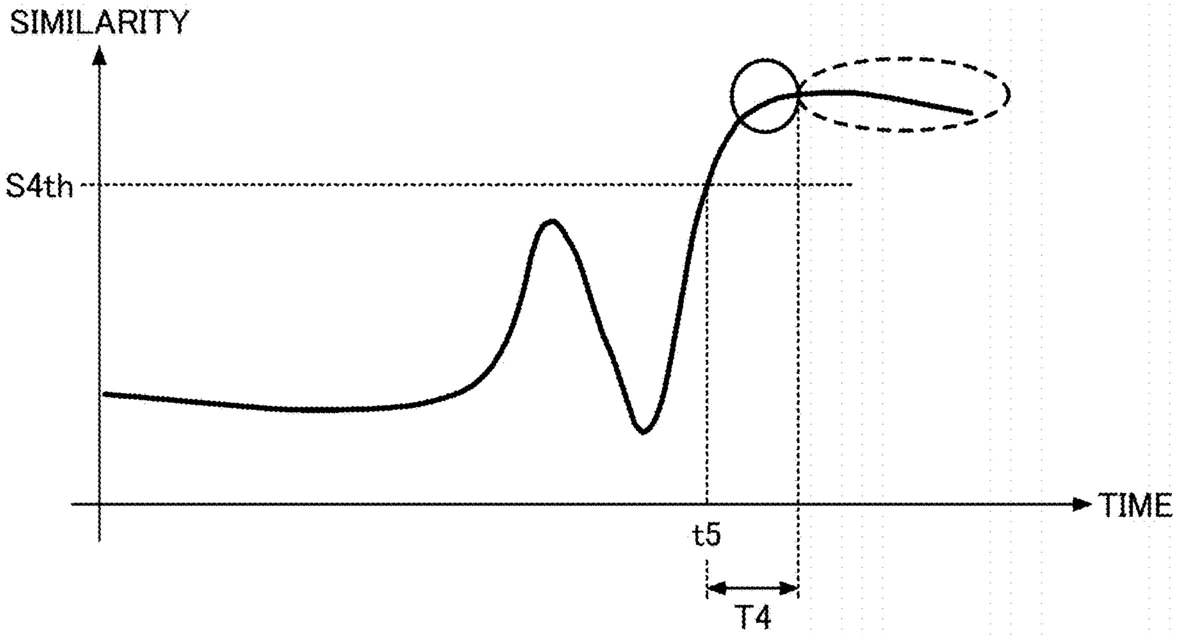
FIG. 11 is a diagram illustrating a fifth example of the method of estimating the timing of a predetermined event in the golf swing motion in the video.
Figure 12:
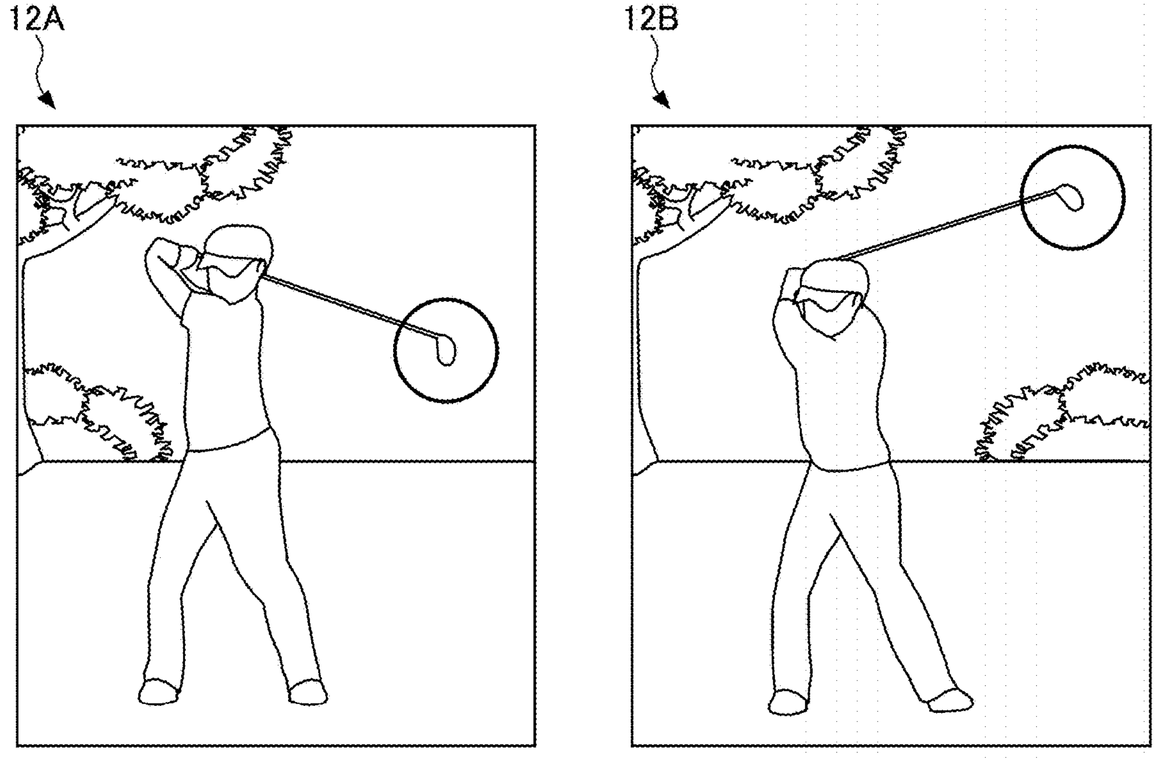
FIG. 12 is a diagram illustrating specific examples of an image at a timing of top-of-swing in the golf swing motion of the user.
Figure 13:
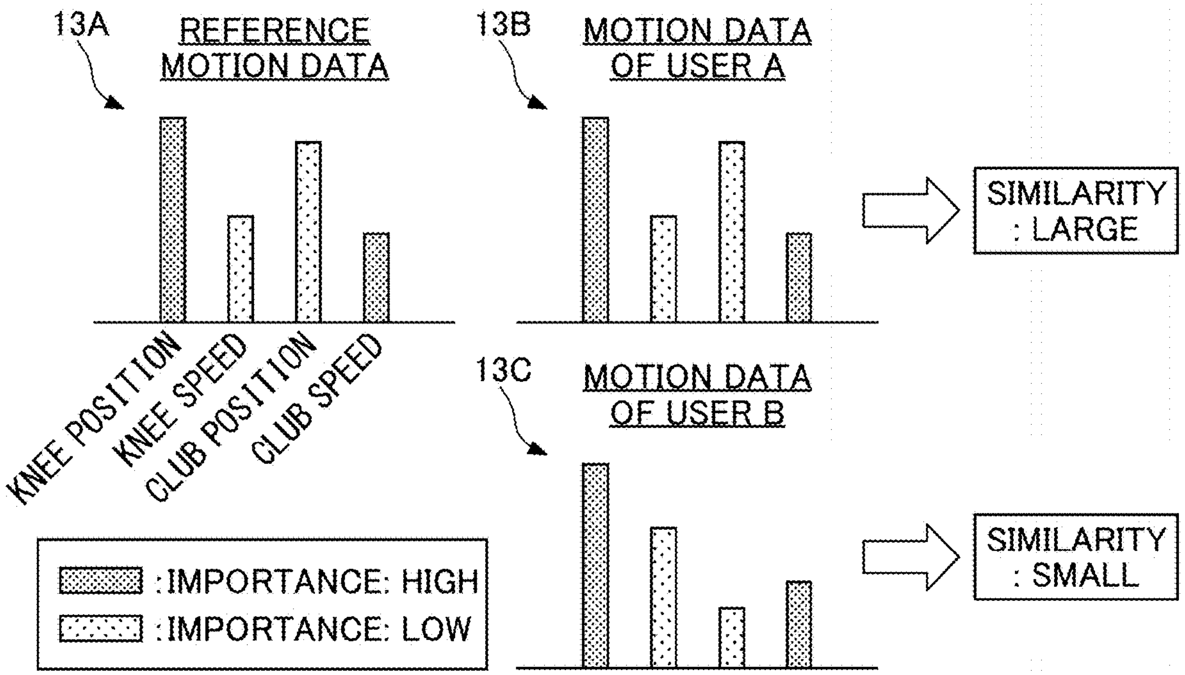
FIG. 13 is a diagram illustrating the method of estimating the timing of a predetermined event in the golf swing motion in the video with comparative examples.
Figure 14:
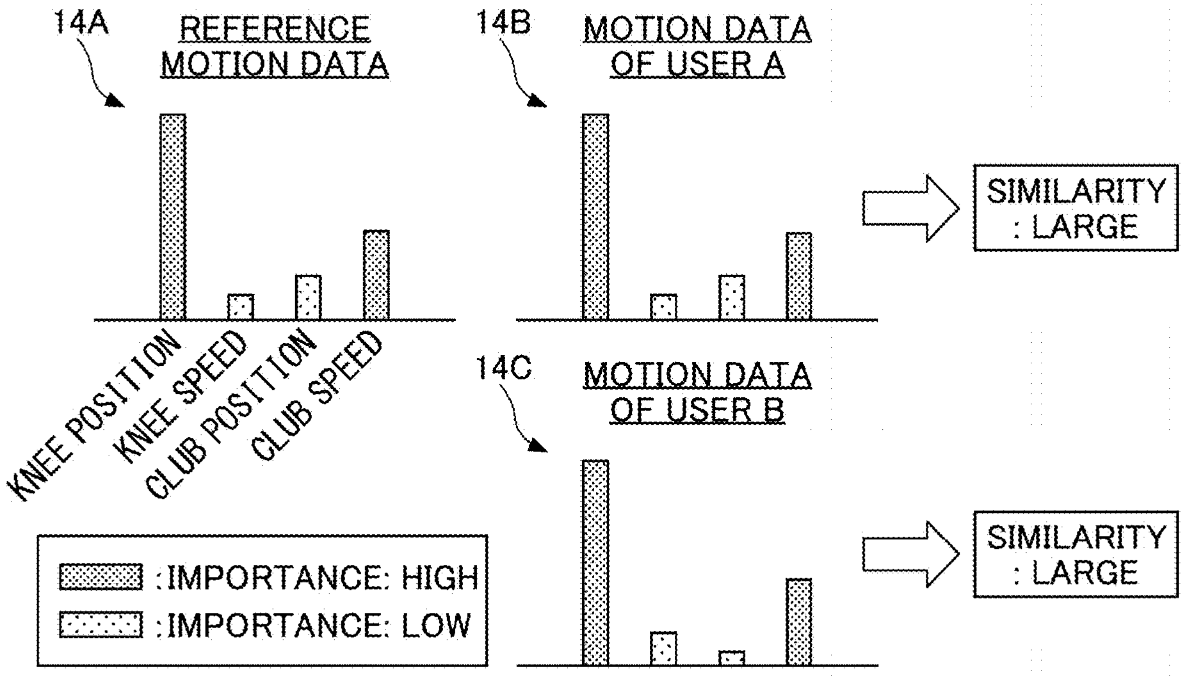
FIG. 14 is a diagram illustrating a sixth example of the method of estimating the timing of a predetermined event in the golf swing motion in the video.
Figure 15:
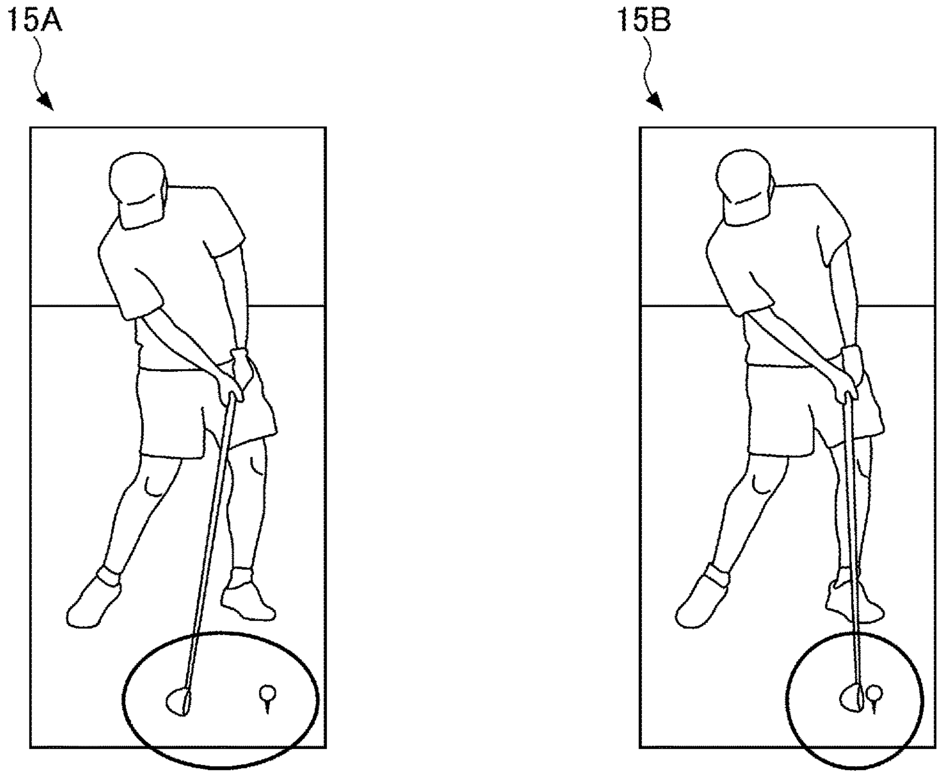
FIG. 15 is a diagram illustrating specific examples of an image at a timing immediately before impact and an image at a timing of impact in the golf swing motion of the user.
Figure 16:
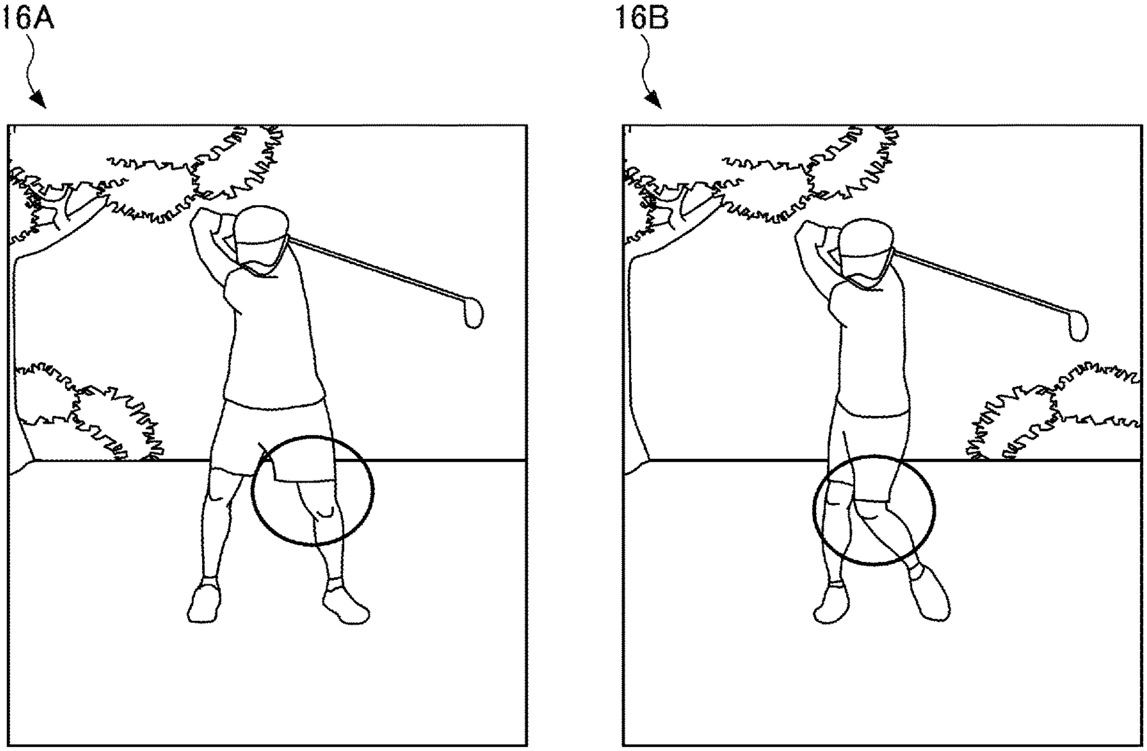
FIG. 16 is a diagram illustrating specific examples of an image at the timing of top-of-swing in the golf swing motion of the user.

FIG. 4 is a block diagram illustrating the first example of a functional configuration of the swing diagnosis system. FIG. 5 is a diagram illustrating an example of a video (a video 500) illustrating swing motion of the user. FIG. 6 is a diagram explaining key points of each of frame images included in the video illustrating the swing motion of the user. FIG. 7 is a diagram illustrating a first example of a method for estimating the timing of a predetermined event in the golf swing motion in the video. FIG. 8 is a diagram illustrating a second example of the method of estimating the timing of a predetermined event in the golf swing motion in the video. FIG. 9 is a diagram illustrating a third example of the method of estimating the timing of a predetermined event in the golf swing motion in the video. FIG. 10 is a diagram illustrating a fourth example of the method of estimating the timing of a predetermined event in the golf swing motion in the video. FIG. 11 is a diagram illustrating a fifth example of the method of estimating the timing of a predetermined event in the golf swing motion in the video. FIG. 12 is a diagram illustrating specific examples of an image at a timing of the top-of-swing in the golf swing motion of the user. FIG. 13 is a diagram illustrating a method of estimating the timing of a predetermined event in the golf swing motion in the video with comparative examples. Specifically, FIG. 13 includes a graph 13A illustrating reference motion data corresponding to a predetermined event, and graphs 13B and 13C illustrating motion data of the timing of the predetermined event in the golf swing motion of users A and B, respectively. FIG. 14 is a diagram illustrating a sixth example of the method of estimating the timing of a predetermined event in the golf swing motion in the video. Specifically, FIG. 14 includes a graph 14A illustrating reference motion data corresponding to a predetermined event, and graphs 14B and 14C illustrating motion data of the timing of the predetermined event in the golf swing motion of the users A and B, respectively. FIG. 15 is a diagram illustrating specific examples of an image at a timing immediately before impact and an image at a timing of impact in the golf swing motion of the user. Specifically, FIG. 15 includes an image 15B which is an image at a timing corresponding to impact in the video illustrating the golf swing motion of the user, and an image 15A which is one frame image preceding the timing. FIG. 16 is a diagram illustrating specific examples of an image at the timing of the top-of-swing in the golf swing motion of the user.

In FIG. 5, frame images 501 to 508 are selected from all the frame images in the video 500, and illustrated. The frame image 501 represents an address position in the golf swing motion of the user. The frame image 502 represents a takeaway position in the golf swing motion of the user. The frame image 503 represents a backswing position in the golf swing motion of the user. The frame image 504 represents a top-of-swing position in the golf swing motion of the user. A frame image 505 represents a halfway down position in the golf swing motion of the user. The frame image 506 represents an impact position in the golf swing motion of the user. The frame image 507 represents a follow-through position in the golf swing motion of the user. The frame image 508 represents a finish position in the golf swing motion of the user.

In FIG. 6, data 600 including data each representing key points (black circles in the picture) of the respective frame images in the video illustrating the golf swing motion of the user is schematically visualized. In FIG. 6, data 601 to 608 each representing the key points of the respective frame images (frame images 501 to 508) of all the frame images in the video 500, respectively, are illustrated. The data 601 represents data of key points corresponding to the frame image 501 representing the address position in the golf swing motion of the user. The data 602 represents data of key points corresponding to the frame image 502 representing the takeaway position in the golf swing motion of the user. The data 603 represents data of key points corresponding to the frame image 503 representing the backswing position in the golf swing motion of the user. The data 604 represents data of key points corresponding to the frame image 504 representing the top-of-swing position in the golf swing motion of the user. The data 605 represents data of key points corresponding to the frame image 505 representing the halfway down position in the golf swing motion of the user. The data 606 represents data of key points corresponding to the frame image 506 representing the impact position in the golf swing motion of the user. The data 607 represents data of key points corresponding to the frame image 507 representing the follow-through position in the golf swing motion of the user. The data 608 represents data of key points corresponding to the frame image 508 representing the finish position in the golf swing motion of the user.

As illustrated in FIG. 4, the user terminal 200 includes an application screen display processing part 2001, a video data acquisition part 2002, a video data transmission part 2003, and a diagnosis result data acquisition part 2004. These functions are implemented by, for example, loading an application program (hereinafter, "swing diagnostic application" for convenience) installed in the auxiliary storage device 202 into the memory device 203 and executing the application program by the CPU 204.

The application screen display processing part 2001 displays a screen (hereinafter, referred to as an "application screen") regarding the swing diagnosis application on the display device 208.

The video data acquisition part 2002 acquires data of the video illustrating the golf swing motion of the user from the camera 100. For example, the video data acquisition part 2002 acquires data of the video illustrating the golf swing motion of the user from the camera 100 upon reception of an input from the user on a predetermined application screen using the input device 207. At such a time, the video data acquisition part 2002 may acquire the video that has already been taken by the camera 100, or may acquire the latest video to be acquired by the camera 100 in real time.

The video data transmission part 2003 transmits data of the video illustrating the golf swing motion of the user, which is acquired by the video data acquisition part 2002, to the information processing device 300 through the communication interface 206. For example, the video data transmission part 2003 transmits the video data acquired from the camera 100 to the information processing device 300 upon reception of an input from the user on a predetermined application screen using the input device 207.

The diagnosis result data acquisition part 2004 acquires response data including data of a swing diagnosis result received from the information processing device 300. Contents of the response data including the swing diagnosis result is displayed on the display device 208 by the application screen display processing part 2001. Accordingly, the user can ascertain the contents of the response data including the swing diagnosis result.

As illustrated in FIG. 4, the information processing device 300 also includes a video data acquisition part 3001, a key point extraction part 3002, a motion data acquisition part 3003, a similarity acquisition part 3004, an event timing estimation part 3005, and a swing diagnosis part 3006. These functions are implemented by, for example, loading a program installed in the auxiliary storage device 302 into the memory device 303 and executing the program by the CPU 304. Furthermore, the information processing device 300 includes a video data storage part 3001A, a key point data storage part 3002A, a motion data storage part 3003A, a similarity data storage part 3004A, a reference motion data storage part 3004X, and an event timing data storage part 3005A. These functions are implemented in, for example, storage areas defined in the auxiliary storage device 302 and the memory device 303.

The video data acquisition part 3001 acquires the data of the video illustrating the golf swing motion of the user, which is received from the user terminal 200 (see FIG. 5). The data acquired by the video data acquisition part 3001 is stored in the video data storage part 3001A.

The key point extraction part 3002 reads the data of the video acquired by the video data acquisition part 3001 from the video data storage part 3001A, and extracts, from each of all the frame images in the video, the key points related to the swing motion of the user who is a subject of the video (see FIG. 6).

The key points include key points (hereinafter, "physical key points") which represent body parts of the user, who is the subject of the video, for each of the frame images. For example, as illustrated in FIG. 6, the physical key points represent positions of joints in the skeleton of the user, and the physical key points included in the key points include points in each image corresponding to a head, shoulders, elbows, wrists, waist, knees, ankles, and the like of the user.

The key points also include a key point representing a part of a golf club. As illustrated in FIG. 6, the key point related to the part of the golf club includes a key point corresponding to the head of the golf club.

The key points may include a key point representing a golf ball.

The function of the key point extraction part 3002 is implemented by, for example, an image recognition engine to which an image recognition technique such as a known bone structure detection technique is applied.

The data related to the key points extracted from each frame image by the key point extraction part 3002 is stored in the key point data storage part 3002A. The data related to the key points includes, for example, data representing a key point type, data representing a key point position on an image, and the like.

The motion data acquisition part 3003 reads, from the key point data storage part 3002A, the data which is related to the key points on each frame image in the video and extracted by the key point extraction part 3002, and calculates to acquire, for each frame image, data (hereinafter, "motion data") representing the motion of the user who is the subject of the video. The motion data includes, for example, data representing the motion of the user of the subject and data representing the motion of the golf club held by the user. The motion data may also include data representing motion of a golf ball. The motion data acquisition part 3003 may acquire one type of the motion data or may acquire multiple types of the motion data.

The motion data to be acquired by the motion data acquisition part 3003 includes data representing the motion of the body parts of the user. The data representing the motion of the body parts of the user includes, for example, data representing a position of a joint of a target body part of the user and data representing a joint angle of a target body part of the user. The data representing the motion of the body parts of the user may include data representing a motion speed and a motion direction of a target body part of the user. The number of the target body parts may be one or more.

The motion data to be acquired by the motion data acquisition part 3003 includes data representing the motion of the golf club. For example, the data representing the motion of the golf club includes data representing a position of the head of the golf club and data representing a shaft angle of the golf club. The data representing the motion of the golf club may include data representing a motion speed and a motion direction of the head of the golf club.

The motion data to be acquired by the motion data acquisition part 3003 may include data representing the position, the motion speed, the motion direction, and the like of the golf ball.

The motion data acquisition part 3003 calculates the motion data based on, for example, relative positions and attitudes between key points, instead of absolute positions and attitudes of the key points on the image. Accordingly, a situation in which a large difference occurs in the motion data due to a difference in the angle of view of the video can be suppressed. Therefore, for example, even in a situation in which a large variation occurs in the angle of view of a video, such as a case where the user himself/herself records a video using the camera 100 installed in the portable user terminal 200, it is possible to further increase the accuracy of estimation of an event in golf swing motion.

The motion data acquisition part 3003 may 3003 may calculate and acquire motion data normalized by an actual height, a length of a predetermined body part, or the like of the user who is the subject of the video. The predetermined body part is, for example, an arm, a leg, or the like. Alternatively, or in addition, the motion data acquisition part 3003 may calculate and acquire motion data normalized by a distance corresponding to the height or a distance corresponding to the predetermined body part of the user of the subject on the frame image. Accordingly, a situation in which a large difference occurs in motion data due to a difference in the physical size of the user of the subject of the video can be suppressed. Therefore, it is possible to further increase the accuracy of estimation of an event in golf swing motion.

The motion data for each frame image in the video acquired by the motion data acquisition part 3003 is stored in the motion data storage part 3003A.

The similarity acquisition part 3004 calculates and acquires, for each frame image in the video, a similarity between the motion data acquired by the motion data acquisition part 3003 and the reference motion data stored in advance in the reference motion data storage part 3004X.

The reference motion data is motion data serving as a reference representing motion of a person at the time of occurrence of a predetermined event in golf swing motion, and is motion data of the same type as the motion data acquired by the motion data acquisition part 3003. In a case where the motion data acquired by the motion data acquisition part 3003 is of multiple types, multiple types of the reference motion data corresponding to the respective multiple types of the motion data are prepared in advance. Examples of a predetermined event in golf swing motion (hereinafter, simply referred to as a "predetermined event") include address, takeaway, backswing, top-of-swing, halfway down, impact, follow-through, and finish. The predetermined event for which the reference motion data is prepared in advance is a predetermined event to be estimated by the event timing estimation part 3005 described below. The predetermined event to be estimated by the event timing estimation part 3005 may be all or some of the above-mentioned events (address, takeaway, backswing, top-of-swing, halfway down, impact, follow-through, finish, and the like).

In a case where there are predetermined events to be estimated by the event timing estimation part 3005, the similarity acquisition part 3004 calculates the similarity in each of the frame images in the video for each of the predetermined events. In the case where there are predetermined events to be estimated by the event timing estimation part 3005, the similarity acquisition part 3004 also acquires, for example, for each of the predetermined events, the similarity between the motion data and the reference motion data using the same type of the motion data. The similarity acquisition part 3004 may acquire the similarity between the motion data and the reference motion data using a different type of the motion data for at least some of the predetermined events. In a case where different types of the motion data are used, the different types of the motion data may include that all types of the motion data used for each of the predetermined events are different from each other and that some types of the motion data of all types of the motion data are different.

The reference motion data is acquired by performing the same processing as that performed by the key point extraction part 3002 and the motion data acquisition part 3003 described above on a frame image corresponding to a predetermined event extracted from a video of golf swing motion of a predetermined subject, for example.

The predetermined subject may be one person or persons. In the latter case, the reference motion data may be an average of motion data of each subject.

The similarity between the motion data acquired by the motion data acquisition part 3003 and the reference motion data is, for example, a correlation value (correlation coefficient) therebetween. The similarity between the motion data acquired by the motion data acquisition part 3003 and the reference motion data may be a difference of the data of the same type between the two of the motion data and the reference data, or may be a total value of each difference of the data of the same type between the two in a case where the motion data of the multiple types is used. Furthermore, in the case where the motion data of multiple types are used, the similarity acquisition part 3004 may set relative weighting coefficients between the multiple types of the motion data to acquire the similarities between the motion data and the reference motion data (see FIG. 14). At such a time, the same pattern of relative weighting coefficients is set between the respective multiple types of the reference motion data (see FIG. 14). In a case where there are predetermined events to be estimated by the event timing estimation part 3005 and the same multiple types of the motion data are used for all of the predetermined events, the similarity acquisition part 3004 may change the relative weighting pattern between the multiple types of the motion data for each of the predetermined events.

The data of the similarity calculated by the similarity acquisition part 3004 is stored in the similarity data storage part 3004A.

The event timing estimation part 3005 estimates a timing of a predetermined event from the time between the first frame image and the last frame image in the video based on the similarity of each frame image in the video. For example, in a case where there are predetermined events, the event timing estimation part 3005 estimates a timing for each predetermined event from the time between the first frame image and the last frame image in the video based on the similarity of each frame image in the video.

For example, as illustrated in FIG. 7, the event timing estimation part 3005 estimates a time t1 at which the similarity takes the maximum value as the timing of the predetermined event. In such a case, the maximum value of the similarity may be the maximum value among the discrete values of the similarity in time series, or may be the maximum value on a curve approximated from the discrete values of the similarity in time series. In the latter case, a time between times corresponding to two adjacent frame images in the video may be estimated as the timing of the predetermined event.

In a case where there are predetermined events to be estimated, the event timing estimation part 3005 may estimate each timing of the predetermined events in consideration of a temporal relationship among the events.

For example, as illustrated in FIG. 8, the event timing estimation part 3005 estimates, as the timing of the impact, a time t22 at which the similarity corresponding to the impact takes the maximum value in a period following the timing of the top-of-swing (the time indicated by the broken line in the figure). The timing of the top-of-swing is estimated in advance by the same method as in the case of FIG. 7, that is, a method of searching for a timing at which a similarity takes the maximum value in the entire period from the first frame image to the last frame image in the video.

The body parts of the user, the position of the golf club, and the shaft attitude at the timing of the impact are similar to the body parts of the user, the position of the golf club, and the shaft attitude at the timing of address preceding the timing of the top-of-swing. Therefore, in a case where a timing at which the similarity corresponding to the impact takes the maximum value is searched for in the entire period from the first frame image to the last frame image in the video, a time t21 corresponding to the timing of the address may be erroneously estimated as the timing of the impact.

In the case of this example, however, the event timing estimation part 3005 searches for a timing at which the similarity corresponding to the impact takes the maximum value in the period following the timing of the top-of-swing. Accordingly, the occurrence of a situation in which the timing of the address is erroneously estimated as the timing of the impact can be suppressed, and the accuracy of estimation of the timing of the impact can be improved. Furthermore, since the period for searching the maximum value of the similarity corresponding to the impact is limited, the time required to estimate the timing of the impact can be shortened.

The event timing estimation part 3005 may search for a timing at which the similarity corresponding to the halfway down, the impact, the follow-through, or the finish takes the maximum value in the period following the timing of the top-of-swing. Accordingly, similarly to the case of the timing of the impact, the estimation accuracy of the timing of the halfway down, the impact, the follow-through, or the finish can be improved. Furthermore, since the period for searching the maximum value of the similarity is limited, the time required to estimate the timing of the halfway down, the impact, the follow-through, or the finish can be shortened.

The event timing estimation part 3005 may also search for a timing at which the similarity corresponding to the address, the takeaway, or the backswing takes the maximum value in a period preceding the timing of the top-of-swing. Accordingly, the occurrence of a situation in which the timing of the impact following the timing of the top-of-swing is erroneously estimated as the timing of the address or the occurrence of a situation in which the timing of the halfway down following the timing of the top-of-swing is erroneously estimated as the timing of the takeaway or the backswing can be suppressed. Therefore, the estimation accuracy of the timing of the address, the takeaway, or the backswing can be improved. Furthermore, since the search period of the maximum value of the similarity is limited, the time required to estimate the timing of the address, the takeaway, or the backswing can be shortened.

As described above, the event timing estimation part 3005 may estimate a timing of the top-of-swing by searching for a timing at which the similarity corresponding to the top of the swing takes the maximum value in the entire period from the first frame image to the last frame image in the video. The event timing estimation part 3005 may then estimate a timing of the address, the takeaway, or the backswing by searching for a timing at which the corresponding similarity takes the maximum value in the period preceding the timing of the top-of-swing. Furthermore, the event timing estimation part 3005 may estimate a timing of the halfway down, the impact, the follow-through, or the finish by searching for a timing at which the corresponding similarity takes the maximum value in the period following the timing of the top-of-swing. The processing of estimating the timing of the address, the takeaway, or the backswing and the processing of estimating the timing of the halfway down, the impact, the follow-through, or the finish may have any order, and may be performed in parallel.

The event timing estimation part 3005 may estimate a timing of a predetermined event in consideration of the tendency of the change over time in the similarity on the time axis of the video.

For example, as illustrated in FIG. 8, the similarity corresponding to the impact has the minimum value near the timing of the top-of-swing (time indicated by the broken line in the figure). Therefore, the event timing estimation part 3005 may search for a timing at which the similarity corresponding to the impact takes the maximum value in a period following the timing at which the similarity corresponding to the impact is minimized. Accordingly, the estimation accuracy of the timing of the impact can be improved. Furthermore, the event timing estimation part 3005 can estimate the timing of the impact in parallel with the estimation of the timing of the top-of-swing. A time required to estimate a timing of a predetermined event can be therefore shortened.

As illustrated in FIG. 9, for example, the similarity corresponding to the address may be maintained in a relatively high position (see the circle drawn by the broken line in the figure) from a timing far preceding the timing of the address (see the circle drawn by the solid line in the figure), that is, the timing immediately before the club starts to move to the takeaway position. This is because the user is highly likely to maintain the position of almost the same posture as the address from the timing preceding the timing of the address. Therefore, if the timing at which the similarity corresponding to the address takes the maximum value is searched for in the entire period from the first frame image to the last frame image in the video, a timing preceding the timing of the address may be erroneously estimated as the timing of the address.

In this example, however, the event timing estimation part 3005 searches for a timing at which the similarity corresponding to the address takes the maximum value in a period of a predetermined period T1 preceding a time t3 at which the similarity corresponding to the address becomes smaller than a predetermined threshold value S1*th*. The position in which the similarity is smaller than the threshold value S1*th* may be a position in which the similarity is equal to or smaller than the threshold value S1*th* or a position in which the similarity is smaller than the threshold value S1*th*. The event timing estimation part 3005 then estimates the timing at which the similarity corresponding to the address takes the maximum value in the period as the timing of the address. Accordingly, by appropriately setting the threshold value S1*th* and the period T1, the timing immediately before the swing motion is started can be appropriately estimated as the timing of the address. Therefore, the estimation accuracy of the timing of the address can be improved.

Furthermore, for example, the similarity corresponding to the takeaway may have the maximum value at a time point preceding the timing of the address. This is because the user may perform preparatory motion such as moving the golf club to the takeaway position before being in the address position. Therefore, in a case where a timing at which the similarity corresponding to the takeaway takes the maximum value is searched for in the entire period from the first frame image to the last frame image in the video, a timing preceding the timing of the address may be erroneously estimated as the timing of the takeaway.

The event timing estimation part 3005 may however, search for a timing at which the similarity corresponding to the takeaway takes the maximum value in a period of a predetermined period T2 preceding a timing at which the similarity corresponding to the takeaway becomes smaller than a predetermined threshold value S2*th*. The event timing estimation part 3005 then estimates that the timing at which the similarity corresponding to the takeaway takes the maximum value in the period is the timing of the takeaway. Accordingly, by appropriately setting the threshold value S2*th* and the period T2, the timing of the takeaway can be appropriately estimated in the period between the timing of the takeaway and the timing at which the similarity corresponding to takeaway greatly decreases. Therefore, the accuracy of estimation of the takeaway timing can be improved.

For example, as illustrated in FIG. 10, the similarity corresponding to the impact may be maintained in a relatively high state even at the timing of the address and in a period immediately before being in the address position (see the circle drawn by the broken line in the figure). This is because, in the swing motion of golf, the posture of the user, the position of the head of the golf club, and the shaft attitude in the positions of the address and the impact are similar to each other. Therefore, in a case where a timing at which the similarity corresponding to the impact takes the maximum value is searched for in the entire period from the first frame image to the last frame image in the video, a timing of the address or even preceding the timing of the address may be erroneously estimated as the timing of the impact.

In this example, however, the event timing estimation part 3005 searches for a timing at which the similarity corresponding to the impact takes the maximum value in a period of a predetermined period T3 following a time t4 at which the similarity corresponding to the impact becomes relatively larger than a predetermined threshold value S3*th*. The position in which the similarity is relatively larger than the predetermined threshold value S3*th* may be a position in which the similarity is equal to or larger than the predetermined threshold value S3*th* or a position in which the similarity is larger than the predetermined threshold value S3*th*. The event timing estimation part 3005 then estimates that the timing at which the similarity corresponding to the impact takes the maximum value in the period (see the circle drawn by the solid line in the figure) is the timing of the impact. Accordingly, by appropriately setting the threshold value S3*th* and the period T3, the timing of the impact can be appropriately estimated in a period which is following the timing of the address and which starts from a timing at which the similarity corresponding to the impact increases again after the similarity decreases. Therefore, the estimation accuracy of the timing of the impact can be improved.

For example, as illustrated in FIG. 11, the similarity corresponding to the finish may be maintained in a relatively high state even in a period (see the circle drawn by the broken line in the figure) following the timing of the finish (see the circle drawn by the solid line in the figure). This is because the user may maintain the same posture even following the timing of the finish in the golf swing motion. Therefore, in a case where a timing at which the similarity corresponding to the finish takes the maximum value is searched for in the entire period from the first frame image to the last frame image in the video, a timing following the timing of the finish may be erroneously estimated as the timing of the finish.

In this example, however, the event timing estimation part 3005 searches for a timing at which the similarity corresponding to the finish takes the maximum value in a period of a predetermined period T4 following a time t5 at which the similarity corresponding to the finish becomes relatively larger than a predetermined threshold value S4*th*. The event timing estimation part 3005 then estimates that the timing at which the similarity corresponding to the finish takes the maximum value in the period is the timing of the finish. Accordingly, by appropriately setting the threshold value S4*th* and the period T4, the timing immediately after the swing motion is stopped can be appropriately estimated as the timing of the finish. Therefore, the estimation accuracy of the timing of the finish can be improved.

The event timing estimation part 3005 may also estimate a timing of a predetermined event by focusing on a head speed of the golf club over time in the swing motion of golf.

For example, the head speed of the golf club is relatively small at the timing of the address, the takeaway, and the backswing, and becomes substantially zero at the timing of the top-of-swing. The head speed of the golf club accelerates from the timing of the top-of-swing to the timing of the halfway down and to the timing of the impact, and takes the maximum value immediately following the timing of the impact. The head speed of the golf club is greatly reduced from the timing of the follow-through to the timing of the finish. Therefore, a timing at which the head speed of the golf club becomes the minimum can be set as a pseudo timing of the top-of-swing. Thus, the event timing estimation part 3005 may search for a timing at which the similarity corresponding to the address, the takeaway, or the backswing takes the maximum value in a period from the golf club starts moving to the timing at which the head speed is minimized. Similarly, the event timing estimation part 3005 may search for a timing at which the similarity corresponding to the halfway down, the impact, the follow-through, or the finish has the maximum value in a period following the timing at which the head speed after the golf club starts moving is minimized. Accordingly, the estimation accuracy of predetermined events preceding and following the timing of the top-of-swing can be improved, and since the search periods are limited, a time for processing related to the estimation of the predetermined events can be shortened.

Furthermore, a timing at which the head speed of the golf club becomes maximum can be set as a pseudo timing of the impact. Thus, the event timing estimation part 3005 may search for a timing at which the similarity corresponding to the address, the takeaway, the backswing, the top-of-swing, or the halfway down has the maximum value in a period preceding the timing at which the head speed of the golf club is maximized. Similarly, the event timing estimation part 3005 may search for a timing at which the similarity corresponding to the follow-through or the finish has the maximum value in a period following the timing at which the head speed of the golf club is maximized. Accordingly, the estimation accuracy of predetermined events preceding and following the impact can be improved, and since the search periods are limited, a time for processing related to the estimation of the predetermined events can be shortened.

As described above, in a case where multiple types of the motion data are used, the event timing estimation part 3005 may estimate a timing of a predetermined event based on the similarities between the motion data and the reference motion data acquired by setting relative weighting coefficients between the multiple types of the motion data.

For example, the motion data used for estimating a timing of a predetermined event may have a level of importance (high or low) depending on the type of the motion data. For example, the motion data of a type having a high level of importance between the multiple types of the motion data is motion data of a type in which the range of values that can be taken by the users tends to be relatively small at a timing of a target predetermined event. That is, the motion data of a type having a high level of importance is motion data of a type in which the values tend to be relatively close to each other between the users. In other words, the motion data of a type having a high level of importance between the multiple types of the motion data is data representing motion of the body parts, golf club parts, or the like which tend to make similar motion between users at a timing of a target predetermined event. On the other hand, the motion data of a type having a low level of importance between the multiple types of the motion data is motion data of a type in which the range of values that can be taken by the users tends to be relatively large at a timing of a target predetermined event. That is, the motion data of a type having a low level of importance is motion data of a type in which the values tend to relatively deviated from each other between the users. In other words, the motion data of a type having a low level of importance between the multiple types of the motion data is data representing motion of body parts, golf club parts, or the like which tend to make different motion depending on the user at a timing of a target predetermined event.

For example, the head of the golf club substantially stops at the timing of the top-of-swing as a predetermined event. Therefore, in a case where a timing of the top-of-swing is estimated, the head speed data of the golf club may be defined as motion data having a high level of importance. On the other hand, as illustrated in FIG. 12 (images 12A and 12B), the position of the head of the golf club at the timing of the top-of-swing as the predetermined event may be greatly different depending on the user (see the circle in each image). Therefore, in a case where a timing of the top-of-swing is estimated, the position data of the head of the golf club may be defined as the motion data having the low level of importance.

For example, in comparative examples in FIG. 13, weighting coefficients are not set between four types of the motion data including two types of the motion data having a high level of importance and two types of the motion data having a low level of importance, and the values of the motion data are used as they are. The two types of the motion data having a high level of importance are knee position data and golf club head velocity data, and the two types of the motion data having a low level of importance are knee velocity data and golf club head position data.

As illustrated in the graph 13A and the graph 13B in FIG. 13, in the motion data of a timing of a predetermined event in the golf swing motion of the user A, both of the two kinds of motion data having the high level of importance and the two kinds of motion data having the low level of importance represent values relatively close to that of the reference motion data. Therefore, in the comparative examples, the similarity acquisition part evaluates that the similarity between the motion data and the reference motion data at the timing of the predetermined event in the golf swing motion of the user A is relatively large. As a result, in the comparative examples, the event timing estimation part can appropriately estimate the timing of the predetermined event in the video including the golf swing motion of the user A.

On the other hand, as illustrated in the graph 13A and the graph 13C, in the motion data of the timing of the predetermined event in the golf swing motion of the user B, the two kinds of motion data having a high level of importance represent values relatively close to the reference motion data. Two kinds of motion data having a low level of importance, however, represent values relatively deviated from the reference motion data. Therefore, in the comparative examples, the similarity acquisition part evaluates that the similarity between the motion data and the reference motion data at the timing of the predetermined event in the golf swing motion of the user B is relatively small. As a result, in the comparative examples, the event timing estimation part may not appropriately estimate the timing of the predetermined event in the video including the golf swing motion of the user B.

For example, as illustrated in FIG. 14, the similarity acquisition part 3004 sets relative weighting coefficients between the four types of the motion data to calculate (acquire) the similarity between the motion data and the reference motion data. In this example, the similarity acquisition part 3004 sets a weighting coefficient for two types of the motion data having the low level of importance between the four types of the motion data low. Specifically, as illustrated in the graph 14C, the similarity acquisition part 3004 multiplies the two types of the motion data having the low level of importance by a predetermined positive number smaller than 1, thereby setting the weighting coefficient of the two types of the motion data having the low level of importance low, on the assumption that the two types of the motion data having the high level of importance are used as they are. As illustrated in the graph 14A, in the same manner, the similarity acquisition part 3004 multiplies the two types of the reference motion data having the low level of importance by the same positive number, thereby setting the weighting coefficient of the two types of the reference motion data having the low level of importance low, on the assumption that the two types of the reference motion data having the high level of importance are used as they are.

Accordingly, as illustrated in the graph 14A and the graph 14C, the difference between the two types of the motion data having the low level of importance between the motion data of the timing of the predetermined event in the golf swing motion of the user B and the reference motion data becomes relatively small. Therefore, the similarity acquisition part 3004 can evaluate that the similarity between the motion data and the reference motion data at the timing of the predetermined event in the golf swing motion of the user B is relatively large. As a result, the event timing estimation part 3005 can appropriately estimate the timing of the predetermined event in the video including the golf swing motion of the user B.

In a case where multiple types of the motion data are used, the similarity acquisition part 3004 may set weighting coefficients between the multiple types of the motion data according to the relative importance of the motion data to acquire the similarity between the motion data and the reference motion data. Accordingly, the event timing estimation part 3005 can more appropriately estimate the timing of the predetermined event based on the similarity acquired by the similarity acquisition part 3004.

Furthermore, in a case where multiple types of the motion data are used, the similarity acquisition part 3004 may set weighting coefficients between the multiple types of the motion data according to differences in scale between the multiple types of the motion data. The scale is a range of variation in a value of motion data in golf swing motion.

For example, a case is considered in which a timing of a predetermined event is estimated by using position data and speed data of a head of a golf club head in golf swing motion.

The position of the head of the golf club in the golf swing motion has a relative range of variation of about several meters at the maximum. On the other hand, the head speed of the golf club in the golf swing motion varies in a range from 0 m/s to about 50 m/s. Therefore, in a case where the position data and the speed data of the head of the golf club are used as the motion data as they are, the similarity may be greatly influenced by the speed data of the head having a large scale size rather than the position data of the head having a small scale size. As a result, there may be a case where the timing of the predetermined event is not appropriately estimated by using the similarity.

In such a case, the similarity acquisition part 3004 may set a weighting coefficient for the head speed of the golf club having a relatively large scale size low to acquire the similarity between the motion data and the reference motion data. For example, the similarity acquisition part 3004 multiplies the speed data of the golf club by a predetermined positive number smaller than 1, thereby setting the weighting coefficient of the speed data of the golf club to be low, on the assumption that the position data of the head of the golf club is used as it is. Accordingly, the similarity acquisition part 3004 can suppress the influence of the speed data of the head having the relatively large scale size on the similarity between the motion data and the reference motion data. As a result, the event timing estimation part 3005 can appropriately estimate the timing of the predetermined event using the similarity acquired by the similarity acquisition part 3004.

In the case where multiple types of the motion data are used, the similarity acquisition part 3004 may set weighting coefficients between the multiple types of the motion data according to the relative scale size of the multiple types of the motion data to acquire the similarity between the motion data and the reference motion data. Accordingly, the event timing estimation part 3005 can more appropriately estimate the timing of the predetermined event based on the similarity acquired by the similarity acquisition part 3004.

The data of an estimation result of the event timing estimation part 3005 is stored in the event timing data storage part 3005A.

The swing diagnosis part 3006 reads the data of the estimation result of the event timing estimation part 3005 from the event timing data storage part 3005A, and performs swing diagnosis by focusing on a time of occurrence of a predetermined event in the swing motion of the user in the video. For example, the swing diagnosis part 3006 calculates a diagnosis index related to golf swing motion based on a frame image corresponding to the time of occurrence of the predetermined event or frame images in a predetermined period including preceding and following the occurrence of the predetermined event. The diagnostic index related to the golf swing motion includes a head speed, an attack angle, a late hit, a face angle, a position of the center of gravity of a body, a forward bending angle, and the like. The head speed represents a speed of a head of a golf club. The attack angle represents an incident angle of a golf club (head) with respect to a golf ball at a horizontal plane at impact with the golf ball. The late hit represents a time lag between the movement of the arms of a player and the movement of the head of the golf club in the downswing. The face angle represents the direction the club face is pointed in the horizontal direction at impact with the golf ball. The position of the center of gravity of the body represents the position of the center of gravity of centers of mass of body parts. The forward bending angle is an angle in which the upper body is bending forward at address. The swing diagnosis part 3006 performs diagnosis related to the golf swing motion of the user on the basis of the calculated diagnosis index. For example, the swing diagnosis part 3006 performs diagnosis related to conformity of the swing motion of the user with respect to a diagnosis criterion by comparing a diagnosis criterion value, that is, a reference value of the diagnosis index with the value of the calculated diagnosis index.

When the swing diagnosis process is completed, the swing diagnosis part 3006 transmits response data including result data of the swing diagnosis to the user terminal 200 through the communication interface 306. The response data includes, for example, diagnostic index data, advice data based on the diagnostic index, and the like. The response data may include data of joint positions of the user's body parts, data of the head position of the golf club, and the like at the timing of the predetermined event.

As described above, in this example, the information processing device 300 estimates a timing of a predetermined event in a video based on a similarity between motion data for each frame image in the video including golf swing motion of a user and reference motion data representing motion of the user at the time of occurrence of the predetermined event in the golf swing motion. Accordingly, the information processing device 300 can estimate the timing of a predetermined event in golf swing motion based on the magnitude (large or small) of the relative similarity on the time axis of the video. Therefore, it is possible to suppress a situation in which a timing of a predetermined event cannot be estimated due to not satisfying an absolute condition such as a condition related to motion of a human subject or a condition related to a change in pixel values of a specific region in the image, corresponding to the predetermined event. Furthermore, the information processing device 300 can more appropriately estimate a timing of a predetermined event in a video illustrating the golf swing motion of the user.

In this example, the information processing device 300 estimates a timing of a predetermined event in a video using not only motion data representing motion of user's body parts but also motion data representing motion of a predetermined part (for example, the head) of a golf club.

For example, as illustrated in FIG. 15, in the video including the golf swing motion of the user, there is almost no change in the positions of the body parts of the user between an image (image 15A in the figure) of one frame image before the frame image of the timing of the impact and an image (image 15B in the figure) at the timing of the impact. Therefore, if only the motion data representing the motion of the body parts of the user is used, both the timing of the impact and the timings preceding and following the timing of the impact may be erroneously estimated as the timings of the impact being a predetermined event. As a result, for example, the information processing device 300 may not appropriately calculate a diagnosis index corresponding to the timing of the impact such as the attack angle or the face angle, and may not appropriately perform the swing diagnosis.

In the present embodiment, however, the information processing device 300 can more appropriately estimate the timing of the impact by also using the position data of the head of the golf club, for example. This is because the position of the head of the golf club at the timing of the impact can be estimated from the position of the golf ball and the position of the head at the timing of the address. As a result, the information processing device 300 can more appropriately perform the swing diagnosis.

As illustrated in FIG. 16 (an image 16A and an image 16B in the figure), in the golf swing motion, the positions of the body parts of the user, particularly, the positions of the parts (knees) of the lower body at the timing of the top-of-swing may be greatly different depending on the user (see the circle in each image). Therefore, if only the motion data representing the motion of the body parts of the user is used, the timings preceding and following the timing of the top-of-swing may be erroneously estimated as the timing of the top-of-swing being a predetermined event, instead of the timing of the top-of-swing, for example. As a result, the information processing device 300 may not appropriately calculate a diagnosis index corresponding to the timing of the top-of-swing, and may not appropriately perform the swing diagnosis.

In the present embodiment, however, the information processing device 300 can more appropriately estimate the timing of the impact by also using the speed data of the head of the golf club, for example. This is because the head speed of the golf club at the timing of the top-of-swing is substantially zero regardless of the user. As a result, the information processing device 300 can more appropriately perform the swing diagnosis.

[First Example of Operation of Swing Diagnosis System]

A first example of the operation of the swing diagnosis system 1 will be described with reference to FIG. 17. Specifically, an example of the operation of the swing diagnosis system 1 based on the functional configuration of FIG. 4 will be described.

Figure 17:
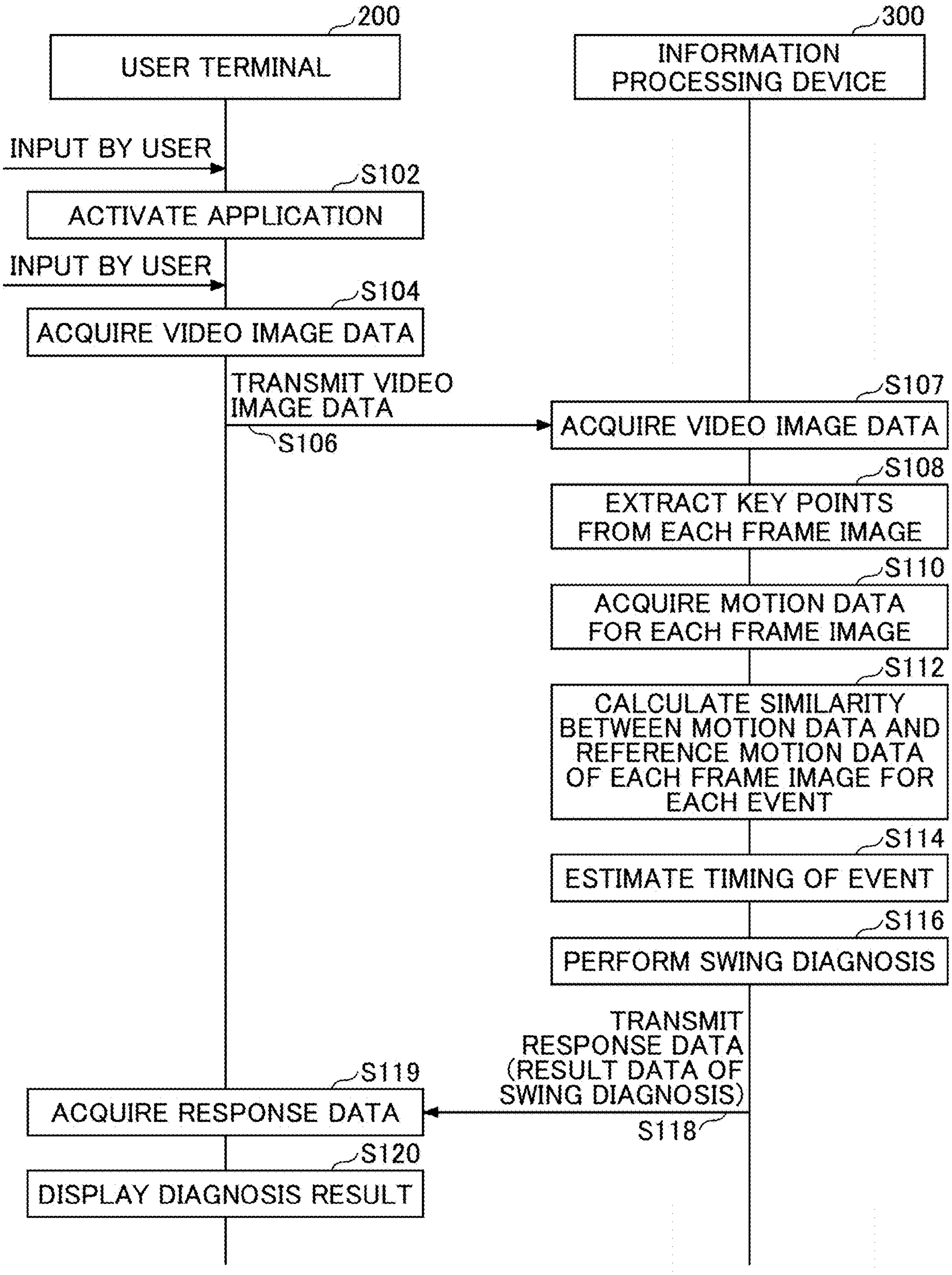
FIG. 17 is a sequence diagram illustrating a first example of swing diagnosis system operation.

FIG. 17 is a sequence diagram illustrating the first example of the operation of the swing diagnosis system 1.

As illustrated in FIG. 17, the user terminal 200 activates the swing diagnostic application upon reception of a predetermined input from the user through the input device 207 (step S102).

After the completion of the process in step S102, the video data acquisition part 2002 acquires video data illustrating the golf swing motion of the user from the camera 100 upon reception of a predetermined input from the user on a predetermined application screen through the input device 207 (step S104).

After the completion of the process in step S104, the video data transmission part 2003 transmits the video data to the information processing device 300 through the communication interface 206 (step S106).

The video data acquisition part 3001 acquires the video data transmitted (uploaded) from the user terminal 200 in the process of step S106 (step S107).

After the completion of the process in step S107, the key point extraction part 3002 extracts key points related to the swing motion of the user of the subject from each frame image in the video (step S108).

After the completion of the process in step S108, the motion data acquisition part 3003 acquires motion data related to the golf swing motion of the user for each frame image in the video, based on the key points (step S110).

After the completion of the process in step S110, the similarity acquisition part 3004 calculates a similarity between the motion data and the reference motion data of each frame image in the video for each predetermined event (step S112).

After the completion of the process in step S112, the event timing estimation part 3005 estimates a timing of each predetermined event based on the similarity of each frame image (step S114).

After the completion of the process in step S114, the swing diagnosis part 3006 performs the swing diagnosis related to the swing motion in the video based on the estimation result of the timing of the predetermined event by the process of step S114 (step S116).

After the completion of the process in step S116, the swing diagnosis part 3006 transmits response data including the result of the swing diagnosis to the user terminal 200 (step S118).

The diagnosis result data acquisition part 2004 acquires the response data including the result of the swing diagnosis transmitted from the information processing device 300 in the process of step S118 (step S119).

After the completion of the process in step S119, the application screen display processing part 2001 causes the display device 208 to display the result of the swing diagnosis (step S120).

As described above, the swing diagnosis system 1 can acquire video data illustrating golf swing motion of a user, estimate a timing of a predetermined event in the swing motion from the video data, and perform swing diagnosis on the basis of the estimation result.

[Second Example of Functional Configuration of Swing Diagnosis System]

A second example of the functional configuration of the swing diagnosis system 1 will be described with reference to FIG. 18.

Hereinafter, the same or corresponding components as those in the first example described above are denoted by the same reference numerals, the description will be made mainly on the parts different from those in the first example described above, and the description of the same or corresponding contents as those in the first example described above may be omitted or simplified.

Figure 18:
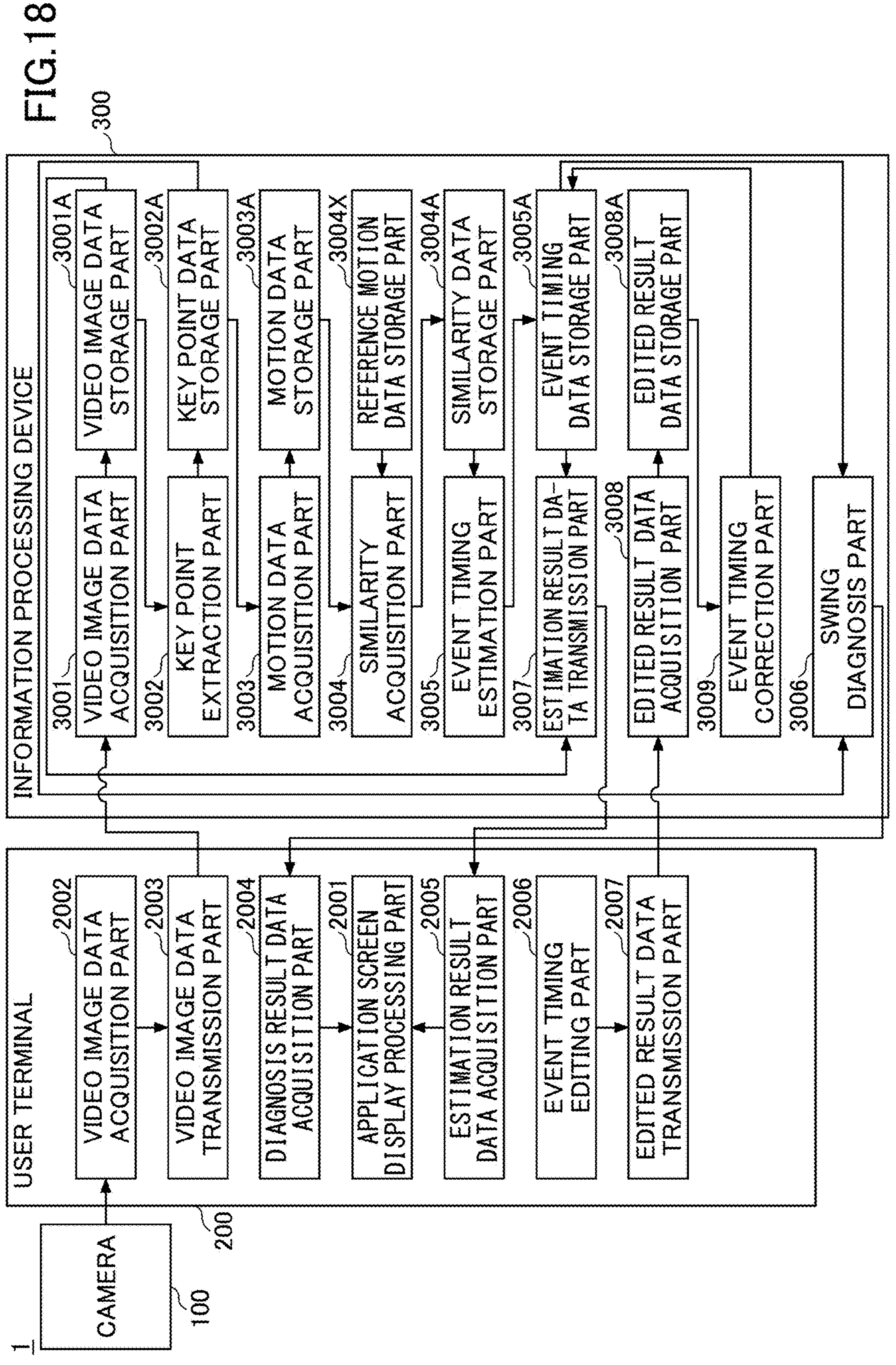
FIG. 18 is a block diagram illustrating a second example of a functional configuration of the swing diagnosis system.

FIG. 18 is a block diagram illustrating the second example of the functional configuration of the swing diagnosis system 1.

As illustrated in FIG. 18, the user terminal 200 includes the application screen display processing part 2001, the video data acquisition part 2002, the video data transmission part 2003, and the diagnosis result data acquisition part 2004, as in the first example described above. The user terminal 200 includes an estimation result data acquisition part 2005, an event timing editing part 2006, and an edited result data transmission part 2007, which are not included in the first example described above. These functions are implemented, for example, by loading the swing diagnostic application installed in the auxiliary storage device 202 into the memory device 203 and executing the swing diagnostic application by the CPU 204.

The estimation result data acquisition part 2005 acquires an estimation result data of a timing of a predetermined event in the golf swing motion of the user in the video data, which is transmitted from the information processing device 300.

The estimation result data acquired by the estimation result data acquisition part 2005 is displayed on the application screen of the display device 208 by the application screen display processing part 2001.

The estimation result data is, for example, video data in which chapter points each corresponding to a timing of a predetermined event are set. Accordingly, the user can easily ascertain the timing of the predetermined event in the golf swing motion of the user in the video by himself/herself.

The event timing editing part 2006 edits the timing of the predetermined event estimated by the information processing device 300 upon reception of a predetermined input from the user on the application screen through the input device 207. Accordingly, for example, in a case where there is an error in the estimation result of the timing of the predetermined event, the user can edit the timing of the predetermined event through the input device 207.

The predetermined event to be edited may be all or a part of the predetermined event to be estimated by the information processing device 300. For example, the predetermined event to be edited is at least one of the address, the top-of-swing, or the impact. This is because, among the address, the takeaway, the backswing, the top-of-swing, the halfway down, the impact, the follow-through, and the finish, the address, the top-of-swing, and the impact are clearly defined and can be easily recognized by the user from the video.

The edited result data transmission part 2007 transmits edited result data of the event timing editing part 2006 to the information processing device 300 through the communication interface 206. Thus, it is possible to reflect the edited result of the timing of the predetermined event in the swing diagnosis in the information processing device 300. The edited result data includes data indicating that the editing has not been performed in a case where the editing has not been performed. Accordingly, the information processing device 300 can be notified that the editing has not been performed.

As illustrated in FIG. 18, the information processing device 300 includes the video data acquisition part 3001, the key point extraction part 3002, the motion data acquisition part 3003, the similarity acquisition part 3004, the event timing estimation part 3005, and the swing diagnosis part 3006, as in the first example described above. The information processing device 300 also includes an estimation result data transmission part 3007, an edited result data acquisition part 3008, and an event timing correction part 3009, which are not included in the first example described above. These functions are implemented by, for example, loading a program installed in the auxiliary storage device 302 into the memory device 303 and executing the program by the CPU 304. The information processing device 300 includes the video data storage part 3001A, the key point data storage part 3002A, the motion data storage part 3003A, the similarity data storage part 3004A, the reference motion data storage part 3004X, and the event timing data storage part 3005A, as in the first example described above. The information processing device 300 includes an edited result data storage part 3008A, which is not included in the first example described above. These functions are implemented in, for example, storage areas defined in the auxiliary storage device 302 and the memory device 303.

The estimation result data transmission part 3007 reads the data corresponding to the estimation result of the event timing estimation part 3005 from the event timing data storage part 3005A, and transmits the data to the user terminal 200 through the communication interface 206.

For example, the estimation result data transmission part 3007 generates video data in which chapter points are set each at a frame image corresponding to a timing of a predetermined event in golf swing motion, with respect to the video data read from the video data storage part 3001A. The estimation result data transmission part 3007 then transmits the video data including the chapter points each corresponding to a timing of a predetermined event in golf swing motion to the user terminal 200 as estimation result data.

The edited result data acquisition part 3008 acquires edited result data of the data of the timing of the predetermined event transmitted from the user terminal 200. The edited result data acquired by the edited result data acquisition part 3008 is stored in the edited result data storage part 3008A.

The event timing correction part 3009 corrects the data of the timing of the predetermined event to be stored in the event timing data storage part 3005A based on the edited result data of the edited result data storage part 3008A.

For example, the event timing correction part 3009 corrects, among all the predetermined events, the data of the timing of the predetermined event which is edited in the edited result data and which is to be stored in the event timing data storage part 3005A to the contents of the edited result data. The event timing correction part 3009 may then re-estimate, among all the predetermined events, the timing of each of the unedited predetermined events to be stored in the event timing data storage part 3005A. For example, in a case where the timing of the top-of-swing is edited, the event timing correction part 3009 estimates the timing of the address, the takeaway, or the backswing preceding the corrected timing of the top-of-swing, with the corrected timing of the top-of-swing as a reference. Similarly, the event timing correction part 3009 estimates the timing of the halfway down, the impact, the follow-through, or the finish following the corrected timing of the top-of-swing, with the corrected timing of the top-of-swing as a reference. The estimation method may be the same as described above. The event timing correction part 3009 then corrects, among all the predetermined events, data of the timing of the predetermined event, which is unedited in the edited result data and which is to be stored in the event timing data storage part 3005A, based on the estimation result.

Note that in a case where the edited result data indicates that the data has not been edited, the event timing correction part 3009 does not correct the data to be stored in the event timing data storage part 3005A.

In a case where the data of the event timing data storage part 3005A is corrected by the event timing correction part 3009, the swing diagnosis part 3006 performs the swing diagnosis based on the corrected data of the event timing data storage part 3005A.

[Second Example of Operation of Swing Diagnosis System]

A second example of the operation of the swing diagnosis system 1 will be described with reference to FIG. 19. Specifically, an example of the operation of the swing diagnosis system 1 based on the functional configuration of FIG. 18 will be described.

Figure 19:
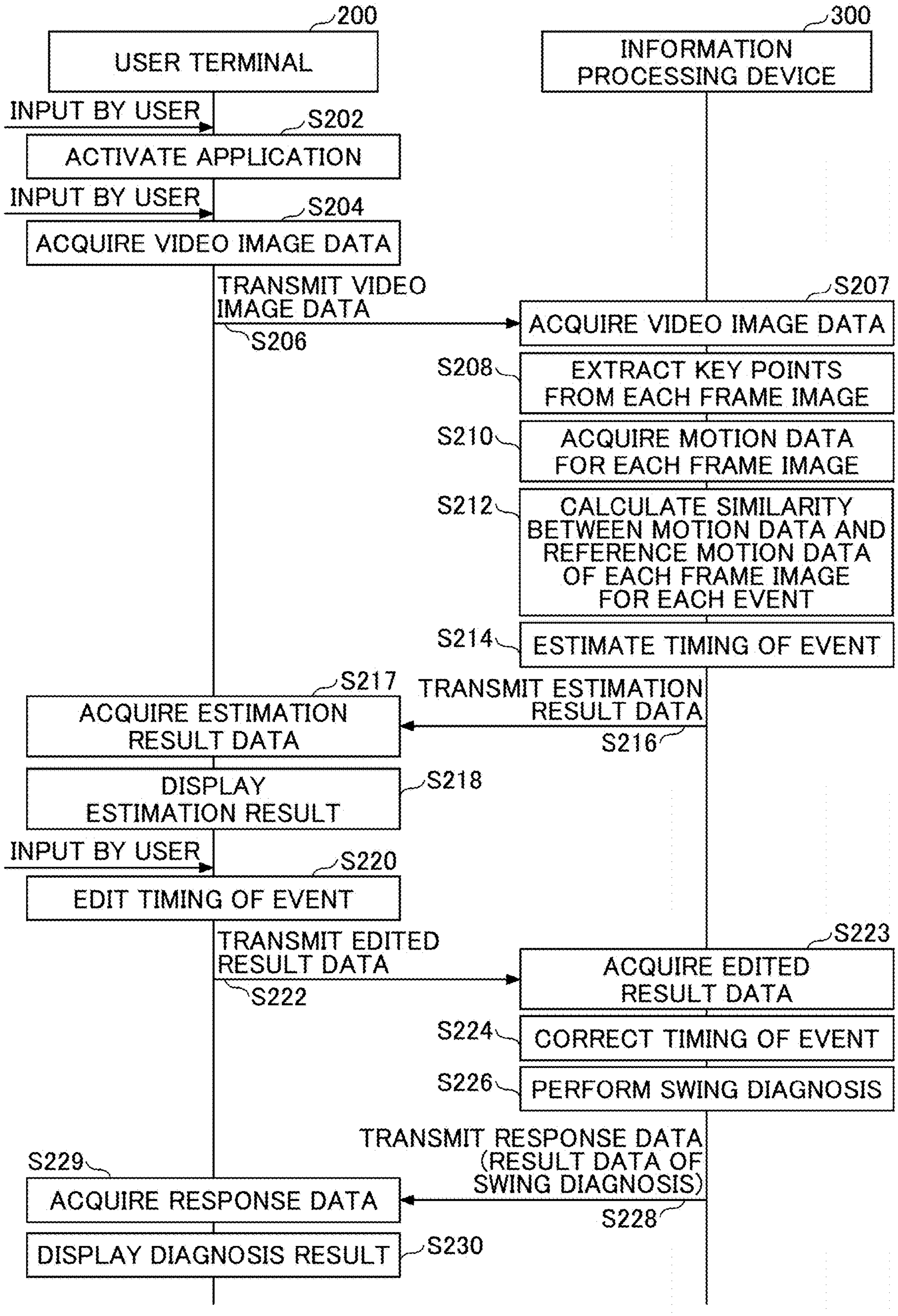
FIG. 19 is a sequence diagram illustrating a second example of the swing diagnosis system operation.

FIG. 19 is a sequence diagram illustrating the second example of the operation of the swing diagnosis system 1.

As illustrated in FIG. 19, the processing in steps S202, S204, S206, S207, S208, S210, S212, and S214 is the same as the processing in steps S102, S104, S106, S107, S108, S110, S112, and S114 in FIG. 17. Therefore, the description thereof is omitted.

After the completion of the process in step S214, the estimation result data transmission part 3007 transmits the estimation result data of the event timing estimation part 3005 to the user terminal through the communication interface 306 (step S216).

Specifically, the estimation result data may be video data estimated by the event timing estimation part 3005 and in which chapter points are set each at a frame image corresponding to a timing of a predetermined event, as described above.

The estimation result data acquisition part 2005 acquires the estimation result data transmitted from the information processing device 300 in the process of step S216 (step S217).

After the completion of the process in step S217, the application screen display processing part 2001 causes the display device 208 to display the estimation result data acquired by the estimation result data acquisition part 2005.

Specifically, the application screen display processing part 2001 may cause the display device 208 to display the video in which chapter points each corresponding to a frame image corresponding to a timing of a predetermined event are set. Accordingly, by performing input to set chapter points on the video through the input device 207, the user can ascertain the position of the golf swing motion in the frame image corresponding to the timing of the predetermined event and determine whether or not editing is necessary.

After the completion of the process in step S218, the event timing editing part 2006 edits the timing of the predetermined event in the golf swing motion in the video upon reception of an input from the user on the application screen through the input device 207 (step S220).

After the completion of the process in step S220, the edited result data transmission part 2007 transmits the edited result data obtained in the process in step S220 to the information processing device 300 through the communication interface 206 (step S222).

The edited result data acquisition part 3008 acquires the edited result data transmitted from the user terminal 200 in the process of step S222 (step S223).

After the completion of the process in step S223, the event timing correction part 3009 corrects the data of the timing of the predetermined event to be stored in the event timing data storage part 3005A based on the edited result data (step S224).

After the completion of the process in step S224, the swing diagnosis part 3006 performs the swing diagnosis based on the data of the timing of the predetermined event which has been corrected by the process of step S224 and which is to be stored in the event timing data storage part 3005A (step S226).

Steps S228 to S230 are the same as the processes of steps S118 to S120 of FIG. 17, and thus the description thereof will be omitted.

As described above, in this example, the swing diagnosis system 1 can acquire video data illustrating golf swing motion of a user, and cause the user to designate a timing of a predetermined event in the swing motion in the video data.

Another Embodiment

Another embodiment will be described.

The above-described embodiment may be modified or changed as appropriate.

For example, in the above-described embodiment, the functions of the user terminal 200 and the information processing device 300 may be implemented by one information processing device or may be implemented by three or more information processing devices in a distributed manner.

In the above-described embodiment (the second example of the functional configuration of the swing diagnosis system 1) or any modified or changed examples thereof, the user may designate a timing for each of some of the predetermined events from the beginning. Some of the predetermined events include at least one of the address, the top-of-swing, or the impact, for example.

The method of estimating the timing of a predetermined event in the golf motion in the above-described embodiment and any modified or changed examples thereof may be applied to a case where a predetermined event in motion different from the golf motion in a video is estimated. The other motion is, for example, tennis swing motion.

[Operations]

Operations of the information processing method, the program, and the information processing device according to the present embodiment will be described.

In the present embodiment, the information processing method is executed by the information processing device, and includes an extraction step, an acquisition step, and an estimation step. The information processing device is, for example, the information processing device 300 described above. The extraction step is, for example, the above-described steps S108 and S208. The acquisition step is, for example, the above-described steps S110 and S210. The estimation step is, for example, the above-described steps S114 and S214. Specifically, in the extraction step, the information processing device extracts key points related to predetermined motion of a human subject from each frame image included in a video, the key points including a key point representing a body part of the human subject and a key point representing a predetermined tool held by the person. The predetermined motion is, for example, the above-described golf swing motion, and the predetermined tool is, for example, a golf club. In the acquisition step, based on the key points extracted in the extraction step, the information processing device acquires data representing the motion of the person and the golf club in each of the images, the data including data related to either positions, velocities, or both of the body part of the person and the golf club. In the estimation step, the information processing device estimates a timing of a predetermined event in the video based on a similarity between the data acquired in the acquisition step for each of the images and reference data representing motion of a person and a golf club at a time of occurrence of a predetermined event in predetermined motion.

In the present embodiment, the program may cause the information processing device to execute the extraction step, the acquisition step, and the estimation step.

In the present embodiment, the information processing device may include an extraction part, an acquisition part, a storage part, and an estimation part. The extraction part is, for example, the key point extraction part 3002 described above. The acquisition part is, for example, the motion data acquisition part 3003 described above. The storage part is, for example, the reference motion data storage part 3004X described above. The estimation part is, for example, the event timing estimation part 3005 described above. Specifically, the extraction part extracts key points related to predetermined motion of a human subject from each frame image included in a video, the key points including a key point representing a body part of the human subject and a key point representing a predetermined tool held by the person. The acquisition part acquires, based on the key points extracted by the extraction part, data representing the motion of the person and the golf club in each of the images, the data including data related to either positions, velocities, or both of the body part of the person and the golf club. The storage part stores reference data representing motion of a person and a golf club at a time of occurrence of a predetermined event in predetermined motion. The estimation part estimates the timing of the predetermined event in the video based on a similarity between the data acquired by the acquisition part for each of the images and the reference data.

Accordingly, the information processing device can estimate a timing at which the similarity between the data acquired by the acquisition part for each of the images and the reference data takes the maximum value on the time axis on the video as the timing of the predetermined event. For example, even in a case where the difference between the data representing the motion of the human subject on the image corresponding to the predetermined event and the reference data is relatively large, the information processing device can estimate the timing of the predetermined event since the similarity has the maximum value on the time axis on the video. As a result, the information processing device can avoid a situation in which the timing of the predetermined event cannot be estimated due to not satisfying an absolute condition, for example, as in the case where the timing of the predetermined event is estimated based on success or failure of the absolute condition such as a condition related to the motion of the human subject or a condition related to a change in pixel values of a specific region in the image. Therefore, the information processing device can more appropriately estimate the timing of occurrence of the predetermined event related to the predetermined motion in the video illustrating the person performing the predetermined motion. Furthermore, even in a case where it is difficult to define a condition for estimating a timing, such as a predetermined event (for example, halfway down of the golf swing motion) for which there is no clear definition, the information processing device can appropriately estimate the timing by preparing reference data corresponding to a predetermined timing.

In the present embodiment, the predetermined motion may be golf swing motion. Key points may include a key point of a golf ball.

Thus, the information processing device can more appropriately estimate the timing of the predetermined event in the golf swing motion.

In the present embodiment, the data acquired in the acquisition step may include data representing motion of the body parts of the human subject.

Thus, the information processing device can evaluate the similarity between the data representing the motion of the human subject on the video and the reference data for the body parts. The information processing device can therefore more appropriately estimate the timing of the predetermined event in the predetermined motion.

In the present embodiment, the predetermined motion may be golf swing motion. A predetermined event may include at least one of the address, the takeaway, the backswing, the top-of-swing, the halfway down, the impact, the follow-through, or the finish.

Thus, the information processing device can estimate a timing of a typical predetermined event in golf swing motion.

In the present embodiment, the reference data may be data representing an average of motions of two or more persons at a time of occurrence of a predetermined event in predetermined motion.

Thus, the reference data can be adjusted so as to approach the middle of the variation range in the motion of the person at the time of occurrence of the predetermined event in the predetermined motion. The information processing device can then more appropriately estimate the timing of the predetermined event in the predetermined motion.

In the present embodiment, in the estimation step, the timing of the predetermined event may be estimated in a period preceding or following the predetermined timing in the video.

Thus, the information processing device can more appropriately estimate the timing of the predetermined event by using a predetermined timing having a correlation with the timing of the predetermined event on the time axis on the video.

In the present embodiment, the predetermined event includes a first event and a second event, and, in the estimation step, after estimating the timing of the first event, a timing of the second event may be estimated in a period preceding or following a timing of the first event, which serves as a predetermined timing, in the video.

Thus, the information processing device can estimate the second event at a timing preceding or following the estimated first event in accordance with a predefined temporal relationship between the first event and the second event. The information processing device can therefore more appropriately estimate the timing of the second event.

In the present embodiment, the predetermined motion may be golf swing motion. The predetermined timing may be a timing at which the speed of the golf club takes the maximum value or the minimum value.

Thus, the information processing device can estimate the timing of the predetermined event using the known relationship between the change in the speed of the golf club on the time axis on the video and the timing of the predetermined event. Therefore, the information processing device can more appropriately estimate the timing of the predetermined event.

In the present embodiment, the predetermined motion may be golf swing motion. The predetermined timing may be a timing at which the similarity takes a minimum value.

Thus, the information processing device can estimate the timing of the predetermined event in accordance with the known tendency regarding the change in the similarity on the time axis on the video. Therefore, the information processing device can more appropriately estimate the timing of the predetermined event.

In the present embodiment, in the estimation step, the timing of the predetermined event may be estimated within a predetermined period preceding or following a period in which the similarity is smaller than a predetermined threshold value. The predetermined threshold value is, for example, each of the above-described threshold values S1*th* to S4*th*. The predetermined period is, for example, each of the above-described periods T1 to T4.

Thus, for example, even in a case where the motion of a person who is similar but different from the human subject corresponding to the predetermined event appears before the start of the predetermined motion on the video and the similarity becomes relatively large, the information processing device can estimate the predetermined timing based on the time point at which the predetermined motion is started and the similarity decreases. Therefore, the information processing device can more appropriately estimate the timing of the predetermined event.

In the present embodiment, the predetermined timing may be a timing designated by a user.

Thus, the information processing device can more appropriately estimate the timing of the predetermined event by using the predetermined timing having a correlation with the timing of the predetermined event, which is designated by the user who has checked the video, for example.

In the present embodiment, in the acquisition step, data normalized by a height of the human subject or a length of a body part may be acquired. The reference data may then be data normalized in the same way as in the acquisition step.

Thus, the information processing device can suppress the influence of the physical size of the human subject on the data representing the motion of the human subject acquired in the acquisition step. Therefore, the information processing device can more appropriately estimate the timing of the predetermined event.

In the present embodiment, in the acquisition step, the data may be data normalized by a distance corresponding to a height of the human subject on the image, a distance corresponding to a length of a predetermined body part of the human subject on the image, or a distance corresponding to a length of a tool used for the predetermined motion on the image. The reference data may then be data normalized in the same way as in the acquisition step.

Thus, the information processing device can suppress the influence of the physical size of the human subject and the size of the human subject in the image on the data representing the motion of the human subject acquired in the acquisition step. Therefore, the information processing device can more appropriately estimate the timing of the predetermined event.

In the present embodiment, in the acquisition step, multiple types of data may be acquired. In the estimation step, the timing of the predetermined event in the video may be estimated based on the similarity between the multiple types of the data and multiple types of reference data corresponding to the multiple types of the data in consideration of relative weighting between the multiple types of the data.

Thus, the information processing device can set the weighting coefficients between the multiple types of the data according to the level of importance or the scale size between the multiple types of the data to acquire similarities between the multiple types of the data and the multiple types of the reference data. Therefore, the information processing device can suppress the influence of data having a low level of importance and data having a large scale, and as a result, can more appropriately estimate the timing of the predetermined event in the video.

In the present embodiment, there may be multiple predetermined events. The weighting pattern between the multiple types of the data may be different for each of the predetermined events.

Thus, for example, the level of importance between the multiple types of the data may change for each of the multiple predetermined events; however, the information processing device can make the weighting pattern different for each of the predetermined events according to the level of importance of the target event. Therefore, the information processing device can more appropriately estimate the timing of each of the predetermined events. Furthermore, the information processing device can use, for each of the predetermined events, the same types of the data. Therefore, the information processing device can estimate each timing for the predetermined events in the video by changing only a parameter to which a weighting coefficient to be set on the assumption that the same type of data is used, for example. Therefore, complication of the processing of the information processing device can be suppressed and commonality of software (program) for estimating the timing of the predetermined event in the video for the predetermined events can be achieved.

Although the embodiments have been described in detail, the present disclosure is not limited to such specific embodiments, and various modifications and changes can be made within the scope of the gist described in the claims.

In an aspect of the present disclosure, a program is provided. The program causes an information processing device to execute a method, the method includes:

- extracting multiple key points related to golf swing motion of a human subject from each of multiple images included in a video, the key points including a key point representing a body part of the human subject and a key point representing a golf club;
- acquiring data representing motion of both the human subject and the golf club in each of the images based on the key points extracted in the extracting step, the data including data related to either positions, velocities, or both of the body part of the human subject and the golf club; and
- estimating a timing of a predetermined event in the video based on a similarity between the data acquired for each of the images in the acquiring step and reference data representing motion of a person and a golf club at a time of occurrence of the predetermined event in golf swing motion.

In another aspect of the present disclosure, an information processing device is provided. The device includes:

- an extraction part configured to extract multiple key points related to golf swing motion of a human subject from each of multiple images included in a video, the key points including a key point representing a body part of the human subject and a key point representing a golf club;
- an acquisition part configured to acquire data representing motion of both the human subject and the golf club in each of the images based on the key points extracted from the extraction part, the data including data related to either positions, velocities, or both of the body part of the human subject and the golf club;
- a storage part configured to store reference data representing motion of a person and a golf club at a time of occurrence of a predetermined event in golf swing motion; and
- an estimation part configured to estimate a timing of the predetermined event in the video based on a similarity between the data acquired by the acquisition part for each of the images and the reference data.

According to the above-described embodiments, it is possible to more appropriately estimate a timing of an occurrence of a predetermined event related to golf swing motion from a video illustrating a person who performs the golf swing motion and a golf club held by the person.

What is claimed is:

1. An information processing method executed by an information processing device, the information processing method comprising:

- extracting a plurality of key points related to golf swing motion of a human subject from each of a plurality of images included in a video, the key points including a key point representing a body part of the human subject and a key point representing a golf club;
- acquiring data representing motion of both the human subject and the golf club in each of the images, based on the plurality of key points, the data including data related to at least one of positions, or velocities, of both the body part of the human subject and the golf club; and
- estimating a timing of at least one predetermined event in the video, based on a similarity between the data acquired for each of the images and reference data representing motion of a person and a golf club, upon occurrence of a condition in which the predetermined event in golf swing motion occurs,
- wherein the acquiring includes a plurality of types of data,
- wherein the estimating includes estimating the timing of the predetermined event in the video, based on a similarity between the types of the data and a plurality of types of the reference data corresponding to the types of the data, in consideration of relative weighting between the types of the data,
- wherein the at least one predetermined event includes a plurality of events,
- wherein a pattern of the relative weighting between the types of the data is different for each event of the plurality of events, and
- wherein the estimating includes, for each of the plurality of events, calculating the similarity by applying a different relative weighting pattern between data of the body part and data of another body part or between the data of the body part and data of the golf club, and estimating the timing of each event based on the calculated similarity.

2. The information processing method as claimed in claim 1, wherein the key points include at least one key point of a golf ball.

3. The information processing method as claimed in claim 1, wherein the acquired data includes data representing motion of a plurality of body parts of the human subject.

4. The information processing method as claimed in claim 1 wherein the predetermined event includes at least one of address, takeaway, backswing, top-of-swing, halfway down, impact, follow-through, or finish.

5. The information processing method as claimed in claim 1, wherein the reference data includes data representing an average of motions of two or more persons at the timing of the predetermined event in golf swing motion.

6. The information processing method as claimed in claim 1, wherein the estimating includes estimating the timing of the predetermined event within a period preceding or following a predetermined timing in the video.

7. The information processing method as claimed in claim 6, wherein the at least one predetermined event includes a first event and a second event, and

- wherein the estimating includes estimating a timing of the second event within a period preceding or following the timing of the first event in the video, after estimating a timing of the first event as the predetermined timing.

8. The information processing method as claimed in claim 6, wherein the predetermined timing includes a timing at which speed of the golf club is maximum or minimum.

9. The information processing method as claimed in claim 6, wherein the predetermined timing is a timing at which the similarity takes a minimum value.

10. The information processing method as claimed in claim 1, wherein the estimating includes estimating the timing of the predetermined event within a predetermined period preceding or following a period in which the similarity is smaller than a predetermined threshold value.

11. The information processing method as claimed in claim 6, wherein the predetermined timing includes a timing designated by a user.

12. The information processing method as claimed in claim 1, wherein the acquiring includes acquiring data normalized by a height or a length of the body part of the human subject, and wherein the reference data includes data normalized in a same manner as in the acquiring.

13. The information processing method as claimed in claim 1, wherein the acquiring includes acquiring data normalized by (i) a distance corresponding to a height of the human subject on an image, (ii) a distance corresponding to a length of a predetermined body part of the human subject on the image, or (iii) a distance corresponding to a length of the golf club on the image, and wherein the reference data includes data normalized in a same manner as in the acquiring.

14. The information processing method according to claim 1, wherein the estimating includes: identifying a period in which the similarity is smaller than a predetermined threshold value; and estimating a timing at which the similarity takes a maximum value within a predetermined period preceding or following the identified period, as the timing of the predetermined event.

15. The information processing method according to claim 1, wherein the plurality of events includes an impact of the golf swing motion, wherein the data of the golf club includes data representing motion of a head of the golf club, and wherein the calculating the similarity includes, for the impact, applying the relative weighting pattern such that a weight assigned to the data representing the motion of the head of the golf club is greater than a weight assigned to the data of the body part.

16. A non-transitory computer readable medium storing a program that causes an information processing device to execute a method, the method including:

extracting a plurality of key points related to golf swing motion of a human subject from each of a plurality of images included in a video, the key points including a key point representing a body part of the human subject and a key point representing a golf club;

acquiring data representing motion of both the human subject and the golf club in each of the images, based on the plurality of key points, the data including data related to at least one of positions, or velocities, of both the body part of the human subject and the golf club; and estimating a timing of a predetermined event in the video, based on a similarity between the data acquired for each of the images and reference data representing motion of a person and a golf club, upon occurrence of a condition in which the predetermined event in golf swing motion occurs, wherein the acquiring includes a plurality of types of data, wherein the estimating includes estimating the timing of the predetermined event in the video, based on a similarity between the types of the data and a plurality of types of the reference data corresponding to the types of the data, in consideration of relative weighting between the types of the data, wherein the at least one predetermined event includes a plurality of events, wherein a pattern of the relative weighting between the types of the data is different for each event of the plurality of events, and wherein the estimating includes, for each of the plurality of events, calculating the similarity by applying a different relative weighting pattern between data of the body part and data of another body part or between the data of the body part and data of the golf club, and estimating the timing of each event based on the calculated similarity.

17. An information processing device comprising:

a memory; and circuitry configured to:

extract a plurality of key points related to golf swing motion of a human subject from each of a plurality of images included in a video, the key points including a key point representing a body part of the human subject and a key point representing a golf club;

acquire data representing motion of both the human subject and the golf club in each of the images based on the plurality of key points, the data including data related to at least one of positions, or velocities, of both the body part of the human subject and the golf club;

store, in the memory, reference data representing motion of a person and a golf club, upon occurrence of a condition in which a predetermined event in golf swing motion occurs; and estimate a timing of the predetermined event in the video, based on a similarity between the acquired data for each of the images and the reference data, wherein the circuitry is further configured to:

acquire a plurality of types of data, and estimate the timing of the predetermined event in the video, based on a similarity between the types of the data and a plurality of types of the reference data corresponding to the types of the data, in consideration of relative weighting between the types of the data, wherein the at least one predetermined event includes a plurality of events, wherein a pattern of the relative weighting between the types of the data is different for each event of the plurality of events, and wherein the circuitry is further configured to:

for each of the plurality of events, calculates the similarity by applying a different relative weighting pattern between data of the body part and data of another body part or between the data of the body part and data of the golf club, and estimates the timing of each event based on the calculated similarity.

* * * * *